United States Patent
Yoda et al.

(10) Patent No.: US 9,995,889 B2
(45) Date of Patent: Jun. 12, 2018

(54) MOUNTING COMPONENT FOR OPTICAL FIBER, OPTICAL MODULE, AND OPTICAL MODULE MANUFACTURING METHOD

(71) Applicant: CITIZEN WATCH CO., LTD., Tokyo (JP)

(72) Inventors: Kaoru Yoda, Nagano (JP); Masafumi Ide, Saitama (JP)

(73) Assignee: CITIZEN WATCH CO., LTD., Tokyo (JP)

( * ) Notice: Subject to any disclaimer, the term of this patent is extended or adjusted under 35 U.S.C. 154(b) by 0 days. days.

(21) Appl. No.: 15/128,057

(22) PCT Filed: Feb. 17, 2015

(86) PCT No.: PCT/JP2015/054312
§ 371 (c)(1),
(2) Date: Sep. 21, 2016

(87) PCT Pub. No.: WO2015/146377
PCT Pub. Date: Oct. 1, 2015

(65) Prior Publication Data
US 2017/0102508 A1    Apr. 13, 2017

(30) Foreign Application Priority Data

Mar. 24, 2014 (JP) ................ 2014-060751
Nov. 27, 2014 (JP) ................ 2014-240459
Dec. 10, 2014 (JP) ................ 2014-250203

(51) Int. Cl.
G02B 6/42    (2006.01)

(52) U.S. Cl.
CPC ......... *G02B 6/4221* (2013.01); *G02B 6/4232* (2013.01); *G02B 6/4239* (2013.01); *G02B 6/4243* (2013.01); *G02B 6/4251* (2013.01)

(58) Field of Classification Search
CPC ................ G02B 6/42; G02B 6/4221
(Continued)

(56) References Cited

U.S. PATENT DOCUMENTS 5,414,787 A    5/1995  Kurata
5,479,540 A  * 12/1995  Boudreau ............ G02B 6/4231
                                                             385/14
(Continued)

FOREIGN PATENT DOCUMENTS

JP    H07-043565 A    2/1995
JP    H09-307122 A   11/1997
(Continued)

OTHER PUBLICATIONS

International Search Report for PCT/JP2015/054312, dated Apr. 21, 2015.
(Continued)

*Primary Examiner* — Kaveh C Kianni

(57) ABSTRACT

Provided is a mounting component for an optical fiber that allows a laser device and an optical fiber to be aligned with higher precision while providing protection for the laser device mounted on a substrate. The a mounting component is a component formed from silicon for optically coupling a laser device to an optical fiber by being bonded to a mounting substrate on which the laser device is mounted, and includes a groove portion for fixedly holding the optical fiber so that a core of the optical fiber is positioned at a predetermined depth with respect to a bonding surface to be bonded to the mounting substrate, and a recessed portion, formed continuous with the groove portion, for accommodating the laser device, wherein a thickness of the mounting component, measured in a direction perpendicular to the bonding surface, is chosen so that a position of the laser device can be detected using an infrared transmission image when the laser device is accommodated in the recessed (Continued)

portion by placing the bonding surface in contact with the mounting substrate.

3 Claims, 42 Drawing Sheets

(58) Field of Classification Search
USPC .......................................................... 385/30
See application file for complete search history.

(56) References Cited

U.S. PATENT DOCUMENTS

| | | | | |
|---|---|---|---|---|
| 6,367,988 B1* | 4/2002 | Auracher | ................. | G02B 6/30 |
| | | | | 385/88 |
| 9,651,743 B2* | 5/2017 | Costello, III | ........ | G02B 6/3853 |
| 2002/0037143 A1* | 3/2002 | Kuhara | .............. | G02B 6/29361 |
| | | | | 385/94 |
| 2014/0185986 A1* | 7/2014 | Costello, III | ............ | G02B 6/32 |
| | | | | 385/33 |
| 2014/0270659 A1* | 9/2014 | Schunk | ................ | G02B 6/4277 |
| | | | | 385/93 |
| 2016/0202422 A1* | 7/2016 | de Jong | ................... | G02B 6/32 |
| | | | | 385/33 |

FOREIGN PATENT DOCUMENTS

| | | |
|---|---|---|
| JP | 2684984 B2 | 12/1997 |
| JP | H10-311936 A | 11/1998 |

OTHER PUBLICATIONS

Written opinion of the International Searching Authority for PCT/JP2015/054312, dated Apr. 21, 2015.

\* cited by examiner

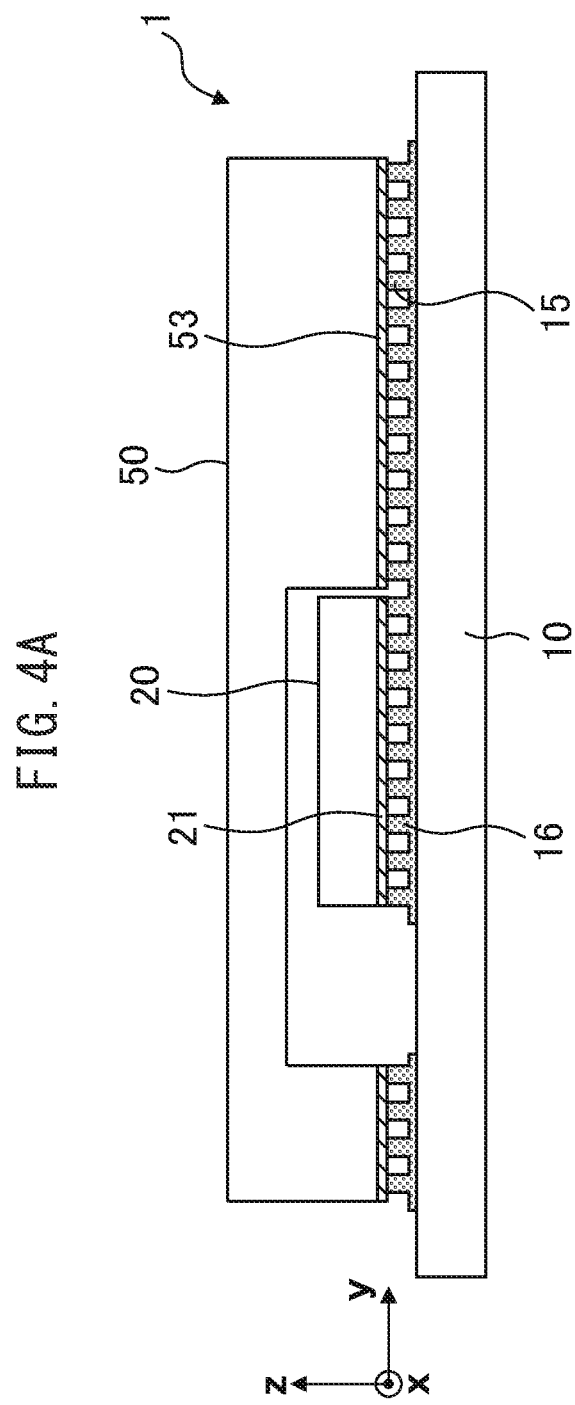

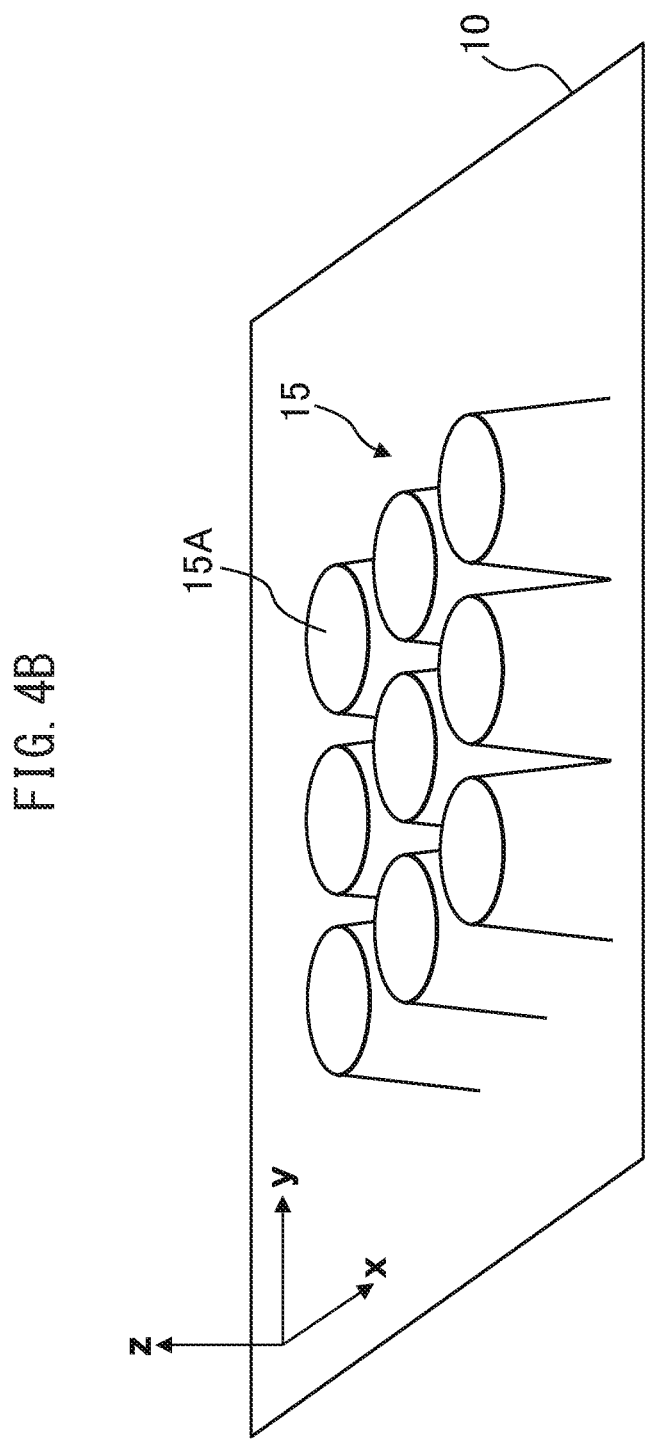

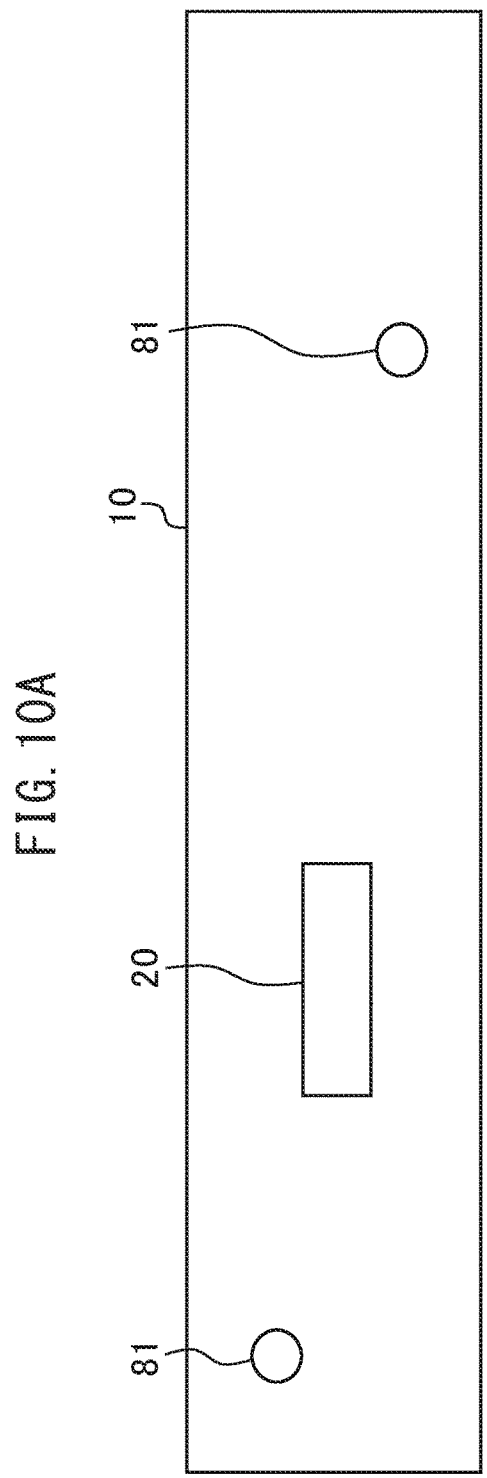

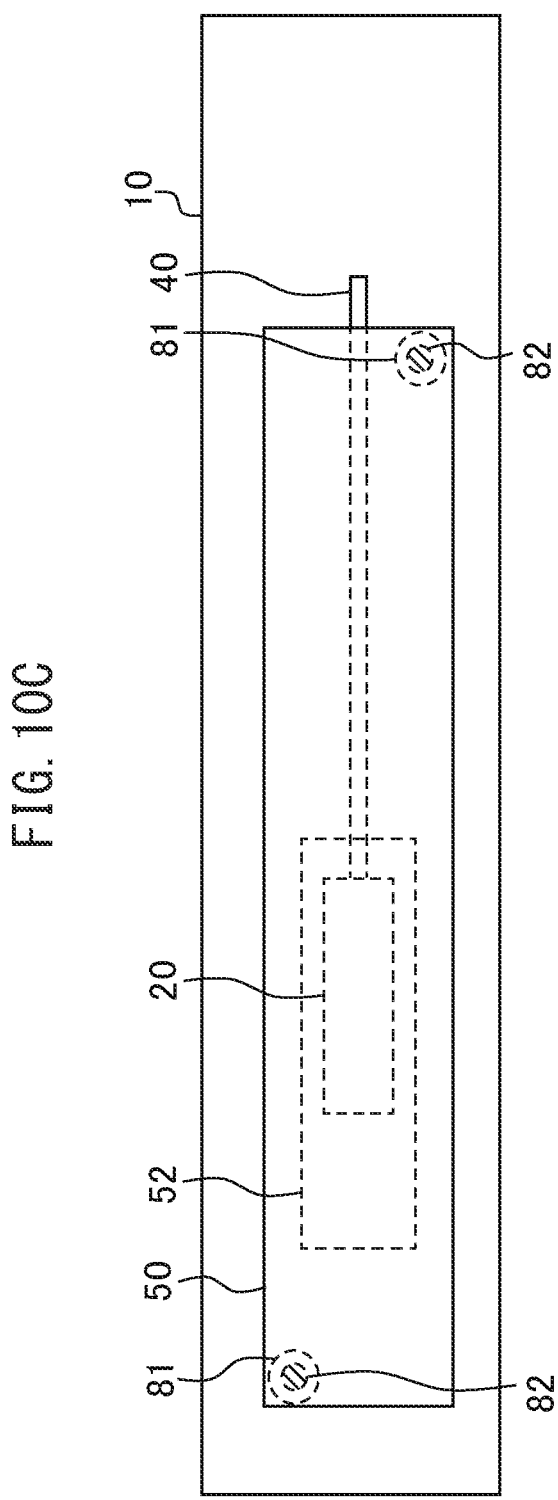

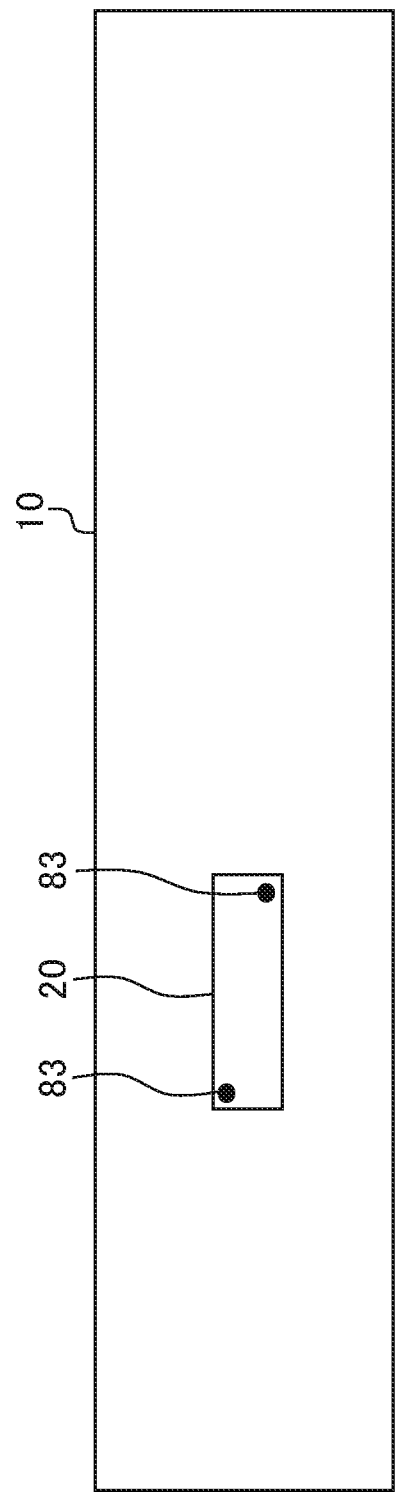

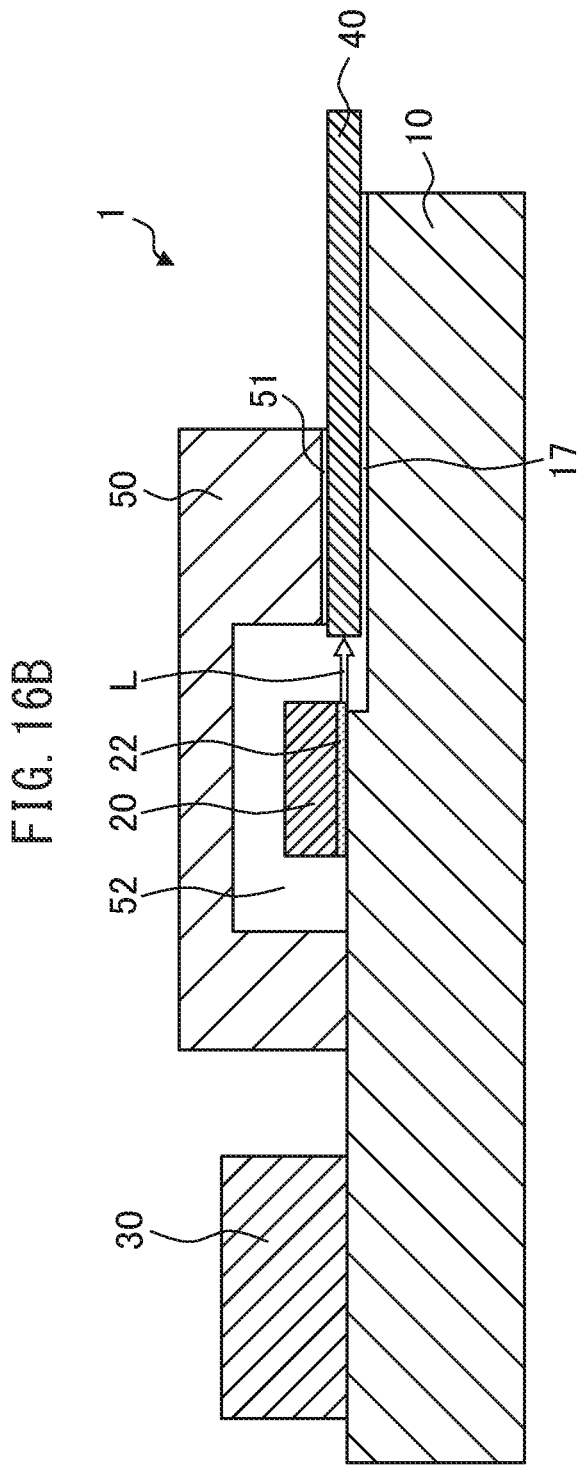

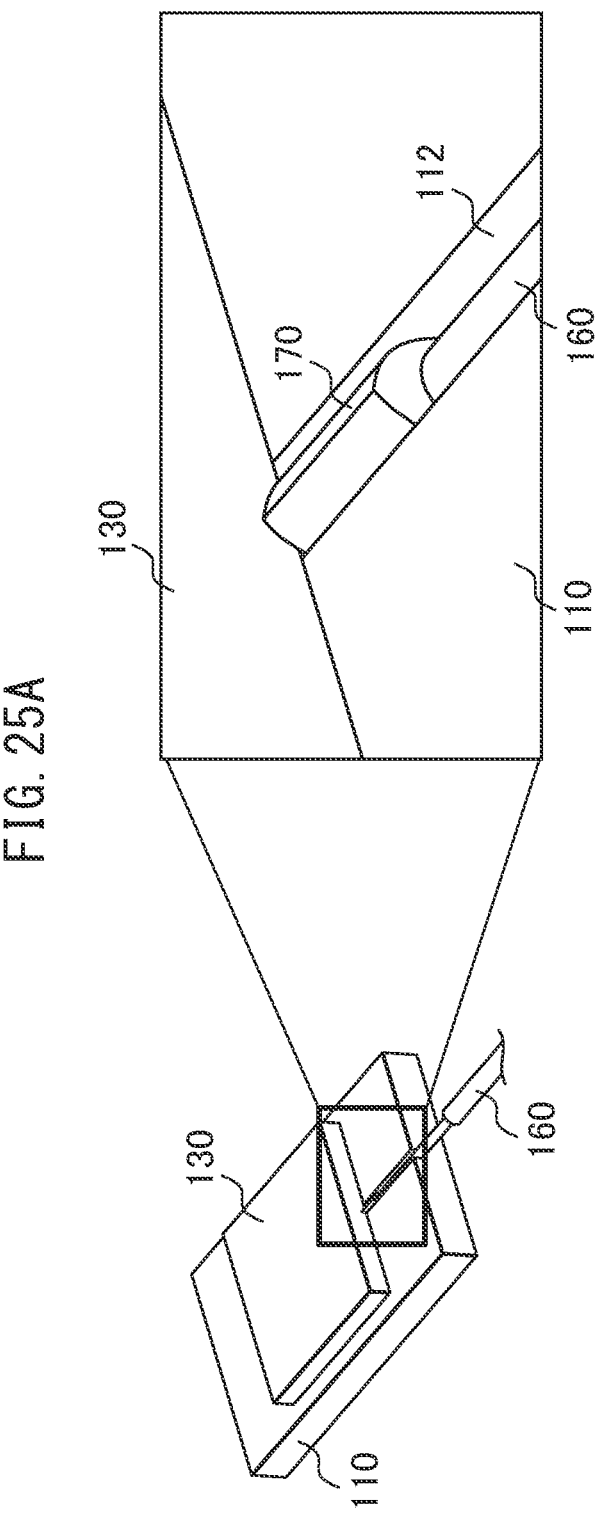

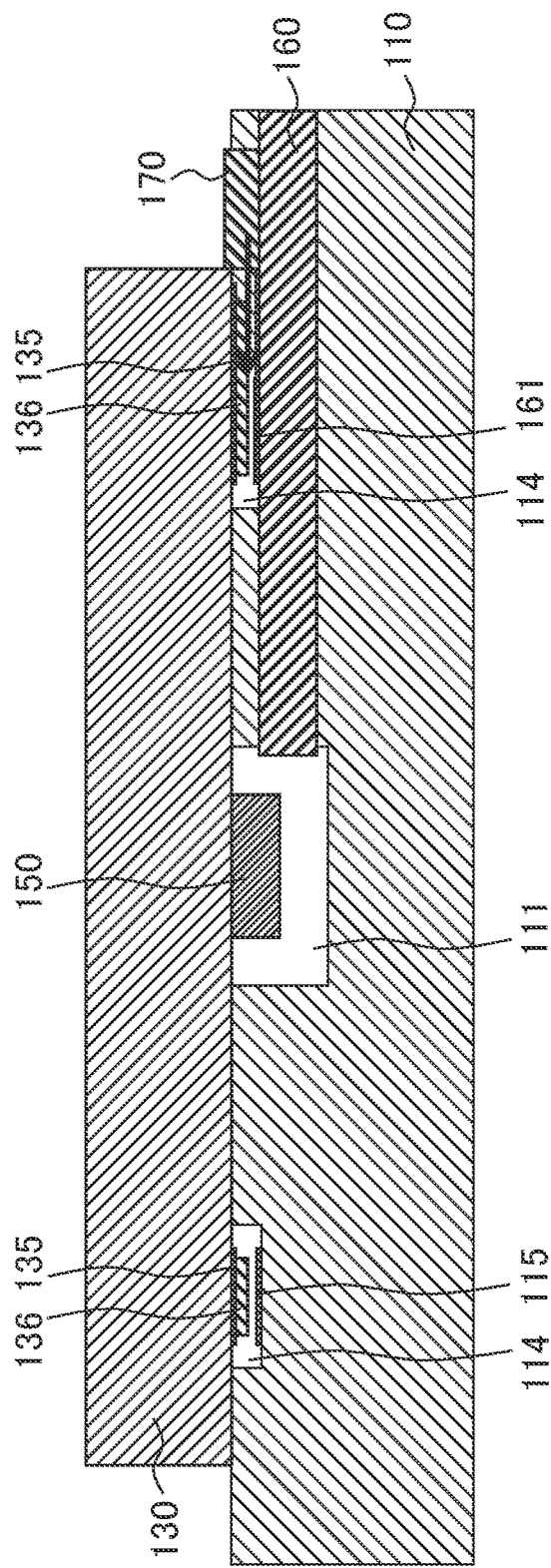

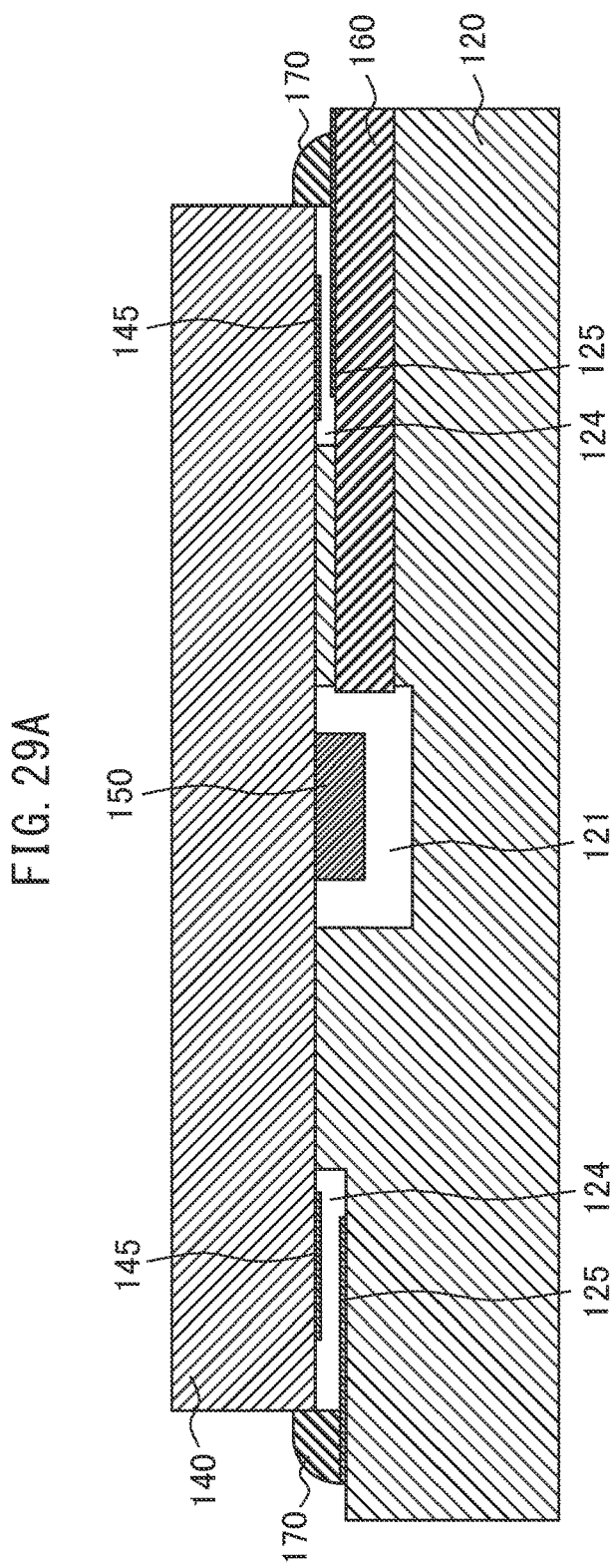

MOUNTING COMPONENT FOR OPTICAL FIBER, OPTICAL MODULE, AND OPTICAL MODULE MANUFACTURING METHOD

TECHNICAL FIELD

The present invention relates to a mounting component for an optical fiber, an optical module, and a fabrication method for the same.

BACKGROUND ART

In an optical module in which light from a laser device is directly introduced (i.e., optically coupled) into an optical fiber, the laser device and the optical fiber must be centered and aligned with respect to each other in order to increase optical coupling efficiency. This alignment process can be accomplished in two ways: passive alignment in which the relative position between the laser device and the optical fiber is adjusted by reference to a preset alignment mark, and active alignment in which the laser device is caused to emit light and the relative position is adjusted while monitoring the light output coupled into the optical fiber. Generally, the active alignment process can achieve highly precise alignment compared with the passive alignment process, but the fabrication cost of the active alignment process is higher because the alignment process takes time.

In view of the above, optical modules have been proposed that are simple in structure and yet can achieve high optical coupling efficiency comparable to that of the prior art active alignment. For example, patent document 1 discloses an optical module in which an LD (laser diode) mounting substrate with an LD mounted on a surface thereof is mounted on a guide substrate provided with a guide groove holding an optical fiber and a concave groove connecting to an end portion of the guide groove, in such a manner that the LD is accommodated within the concave groove. In this optical module, the vertical alignment between the optical fiber and the LD is performed by passive alignment, while the horizontal alignment is performed by active alignment.

In an optical module that uses an optical device such as an LD, the device must be hermetically sealed and protected against infiltration of external moisture, etc., in order to stabilize the characteristics of the device and to improve its reliability. In particular, in the case of a laser device that emits light at a relatively short wavelength, such as blue, the device must be hermetically sealed in order to also prevent accumulation of impurities on the light emitting part, because such a laser device is susceptible to absorption effects by light energy. In view of this, a hermetic sealing structure of an optical module is proposed in which a substrate on which an optical device and an optical fiber are mounted is hermetically sealed by means of such as solder or adhesive.

For example, patent document 2 discloses a hermetic sealing structure of a waveguide-type optical device in which an optical waveguide is formed within a first substrate and an optical fiber is optically coupled to the optical waveguide. In this optical device, a second substrate, on which a first groove is formed at least in a region thereof that opposes an optical waveguide pattern defining the optical waveguide, is bonded in such a manner as to align the groove pattern with the optical waveguide pattern formed on the first substrate.

CITATIONS LIST

Patent Documents

Patent document 1: Japanese Unexamined Patent Publication (Kokai) No. H10-311936
Patent document 2: Japanese Patent No. 2684984

SUMMARY OF INVENTION

However, in the optical module of patent document 1, it is difficult to align the LD and the optical fiber with submicron-order precision in the three directions of x, y, and z. To increase the alignment precision, it is desirable that after aligning them to micron order tolerances as accurately as possible by passive alignment, fine adjustments of submicron order be made efficiently by active alignment. Further, in the case of an optical module containing a laser device, it is important in practice to provide the laser device with a cover and protect the device against damage, dust, etc.

Accordingly, it is an object of the present invention to provide a mounting component for an optical fiber that allows a laser device and an optical fiber to be aligned with higher precision while providing protection for the laser device mounted on a substrate. It is another object of the present invention to provide an optical module that can be made smaller and thinner and can be fabricated at a lower cost than could be achieved without the configuration of the present invention.

Provided is a mounting component formed from silicon for optically coupling a laser device to an optical fiber by being bonded to a mounting substrate on which the laser device is mounted, including a groove portion for fixedly holding the optical fiber so that a core of the optical fiber is positioned at a predetermined depth with respect to a bonding surface to be bonded to the mounting substrate, and a recessed portion, formed continuous with the groove portion, for accommodating the laser device, wherein a thickness of the mounting component, measured in a direction perpendicular to the bonding surface, is chosen so that a position of the laser device can be detected using an infrared transmission image when the laser device is accommodated in the recessed portion by placing the bonding surface in contact with the mounting substrate.

Preferably, the above mounting component contains a stopper layer implemented by silicon-on-insulator, in the groove portion, silicon is removed from the bonding surface down to the stopper layer, and in the recessed portion, silicon is removed from the bonding surface down to a depth deeper than the stopper layer.

Preferably, in the above mounting component, the depth in the direction perpendicular to the bonding surface is not less than 200 μm and not greater than 1000 μm.

Preferably, in the above mounting component, the bonding surface has a metallic film for surface activated bonding to metallic micro-bumps provided on the mounting substrate.

Further, provided is an optical module including a mounting substrate, a laser device mounted on the mounting substrate, an optical fiber optically coupled to the laser device, and a mounting component which is formed from silicon, and which includes a groove portion for fixedly holding the optical fiber so that a core of the optical fiber is positioned at a predetermined depth with respect to a bonding surface to be bonded to the mounting substrate, and a recessed portion formed continuous with the groove portion, the mounting component being bonded to the mounting substrate so as to accommodate the laser device in the recessed portion, wherein the optical fiber fixedly held in the groove portion of the mounting component, and a thickness of the mounting component, measured in a direction perpendicular to the bonding surface, is chosen so that a position of the laser device can be detected using an infrared transmission image.

Preferably, in the above optical module, the laser device is mounted junction-up on the mounting substrate, and the mounting substrate is a flat substrate which is not formed with a groove portion for accommodating the optical fiber.

Preferably, in the above optical module, an integrated circuit for driving the laser device is built into the mounting substrate.

Preferably, in the above optical module, the mounting substrate and the mounting component are each formed with a bonding portion for surface activated bonding and a hermetic sealing metallic pattern surrounding the laser device, and the optical module further includes a hermetic sealing member for hermetically sealing the laser device by closing up a gap formed between the hermetic sealing metallic patterns when the mounting substrate and the mounting component are bonded together by surface activation.

Preferably, in the above optical module, the hermetic sealing metallic patterns of the mounting substrate and the mounting component are formed along the bonding surface so as to be positioned opposite each other, at least one of the mounting substrate and the mounting component includes a hermetic sealing groove portion formed so as to surround the laser device, and the hermetic sealing metallic pattern of at least one of the mounting substrate and the mounting component is formed on a bottom surface of the hermetic sealing groove portion.

Preferably, in the above optical module, at least a portion of the hermetic sealing metallic pattern of the mounting substrate is formed in a position that is not covered with the mounting component, and at least a portion of the hermetic sealing metallic pattern of the mounting component is formed in a position that is not covered with the mounting substrate.

Preferably, in the above optical module, one end of the optical fiber is covered with both the mounting substrate and the mounting component and is optically coupled to the laser device, the other end being brought out to an outside of both the mounting substrate and the mounting component, and the optical fiber includes a hermetic sealing metallic pattern formed on at least a portion of a surface thereof, and the hermetic sealing member is joined to the hermetic sealing metallic pattern formed on the optical fiber, and thereby closes up a gap formed between the optical fiber, the mounting substrate, and the mounting component.

Further, provided is an optical module including first and second substrates each formed with a bonding portion for surface activated bonding, a laser device mounted on one of the first and second substrates, an optical fiber fixed to the other of the first and second substrates and aligned with respect to the laser device, and a hermetic sealing member, wherein each of the first and second substrates is formed with a hermetic sealing metallic pattern surrounding the laser device when the first and second substrates are bonded together so as to cover the laser device, and the hermetic sealing member hermetically seals the laser device by closing up a gap formed between the hermetic sealing metallic patterns when the first and second substrates are bonded together by surface activation.

Further, provided is an optical module fabrication method including the steps of mounting a laser device on a mounting substrate, fixing an optical fiber into a groove portion of a mounting component formed from silicon, the mounting component including, in addition to the groove portion for fixedly holding the optical fiber so that a core of the optical fiber is positioned at a predetermined depth with respect to a bonding surface to be bonded to the mounting substrate, a recessed portion formed continuous with the groove portion, placing the bonding surface of the mounting component in contact with the mounting substrate so as to accommodate the laser device in the recessed portion, while detecting a position of the laser device using an infrared transmission image, positioning the mounting substrate and the mounting component relative to each other so that light output coupled from the laser device into the optical fiber becomes maximum, and bonding together the mounting component and the mounting substrate thus positioned.

Preferably, in the positioning step of the above fabrication method includes while detecting the position of the laser device using the infrared transmission image, adjusting a horizontal position of the optical fiber relative to the laser device by reference to an alignment mark provided on the mounting substrate, and while detecting the light coupled from the laser device into the optical fiber by using a photodetector, determining the horizontal and vertical positions of the optical fiber relative to the laser device so that an output of the photodetector becomes maximum.

Preferably, in the bonding step of the above fabrication method, the mounting substrate and the mounting component are bonded together by surface activation, and the fabrication method further includes the steps of forming a bonding portion for surface activated bonding on each of the mounting substrate and the mounting component, forming a hermetic bonding metallic pattern on each of the mounting substrate and the mounting component so as to surround the laser device when the mounting substrate and the mounting component are bonded together, and hermetically sealing the laser device by closing up a gap formed between the hermetic sealing metallic patterns when the mounting substrate and the mounting component are bonded together.

Preferably, the above fabrication method further includes the step of applying solder to an outer peripheral portion of the mounting substrate or the mounting component bonded to each other, wherein the hermetically sealing step causes the solder to melt thereby closing up the gap formed between the hermetic sealing metallic patterns of the mounting substrate and the mounting component.

Preferably, the above fabrication method further includes the step of forming presolder on the hermetic sealing metallic pattern of at least one of the mounting substrate and the mounting component before bonding.

Preferably, in the solder applying step of the above fabrication method, the solder is applied to an outer peripheral portion of each side of the mounting substrate or the mounting component.

Further, provided is an optical module fabrication method including the steps of forming a bonding portion for surface activated bonding on each of first and second substrates to be bonded together so as to cover a laser device, forming a hermetic bonding metallic pattern on each of the first and second substrates so as to surround the laser device when the first and second substrates are bonded together, mounting the laser device on one of the first and second substrates, fixing an optical fiber to the other of the first and second substrates, placing the second substrate on the first substrate and aligning the laser device and the optical fiber, bonding the first and second substrates together by surface activation, and hermetically sealing the laser device by closing up a gap formed between the hermetic sealing metallic patterns when the first and second substrates are bonded together.

The above mounting component for an optical fiber allows a laser device and an optical fiber to be aligned with higher precision while providing protection for the laser device mounted on a substrate. Further, the above optical module can be made smaller and thinner and can be fabricated at a lower cost than could be achieved without the configuration of the present invention.

BRIEF DESCRIPTION OF DRAWINGS

FIG. 4A is a longitudinal cross-sectional view showing a portion of the optical module 1;

FIG. 4B is an enlarged view of a portion of the bonding portion 15;

FIG. 10A is a diagram showing, by way of example, the alignment marks provided on the Si platform 10;

FIG. 10C is a diagram showing the Si platform 10 of FIG. 10A on which the sub-substrate 50 of FIG. 10B is placed;

FIG. 11A is a diagram showing, by way of example, the alignment marks provided on the LD device 20;

FIG. 16B is a cross-sectional view for comparing the optical modules 4 and 1;

FIG. 25A is a diagram for explaining the step of applying solder 170 to an outer peripheral portion of the sub-substrate 130;

FIG. 25B is a diagram for explaining the step of applying solder 170 to an outer peripheral portion of the sub-substrate 130;

FIG. 29A is a cross-sectional view for explaining how the LD device 150 is hermetically sealed in the optical module 102;

DESCRIPTION OF EMBODIMENTS

Hereinafter, with reference to the accompanying drawings, a mounting component for optical fiber, optical module, and fabrication method will be explained in detail.

However, it should be noted that the present invention is not limited to the drawings or the embodiments described below.

This mounting component functions not only as a fiber submount substrate (hereinafter referred to simply as a "sub-substrate") formed, for example, from silicon but also as a protective component (cover) for a laser device mounted on a mounting substrate. Silicon is transmissive to near-infrared radiation; therefore, when the mounting component is mounted with its bonding surface in contact with the mounting substrate so as to cover the laser device, the position of the laser device can be observed using an infrared camera. Accordingly, the laser device and the optical fiber can be centered and aligned with respect to each other while monitoring a near-infrared transmission image through the cover. This mounting component is designed so that the laser device can be packaged with a higher degree of perfection with the laser device mounted on the substrate.

Figure 1:
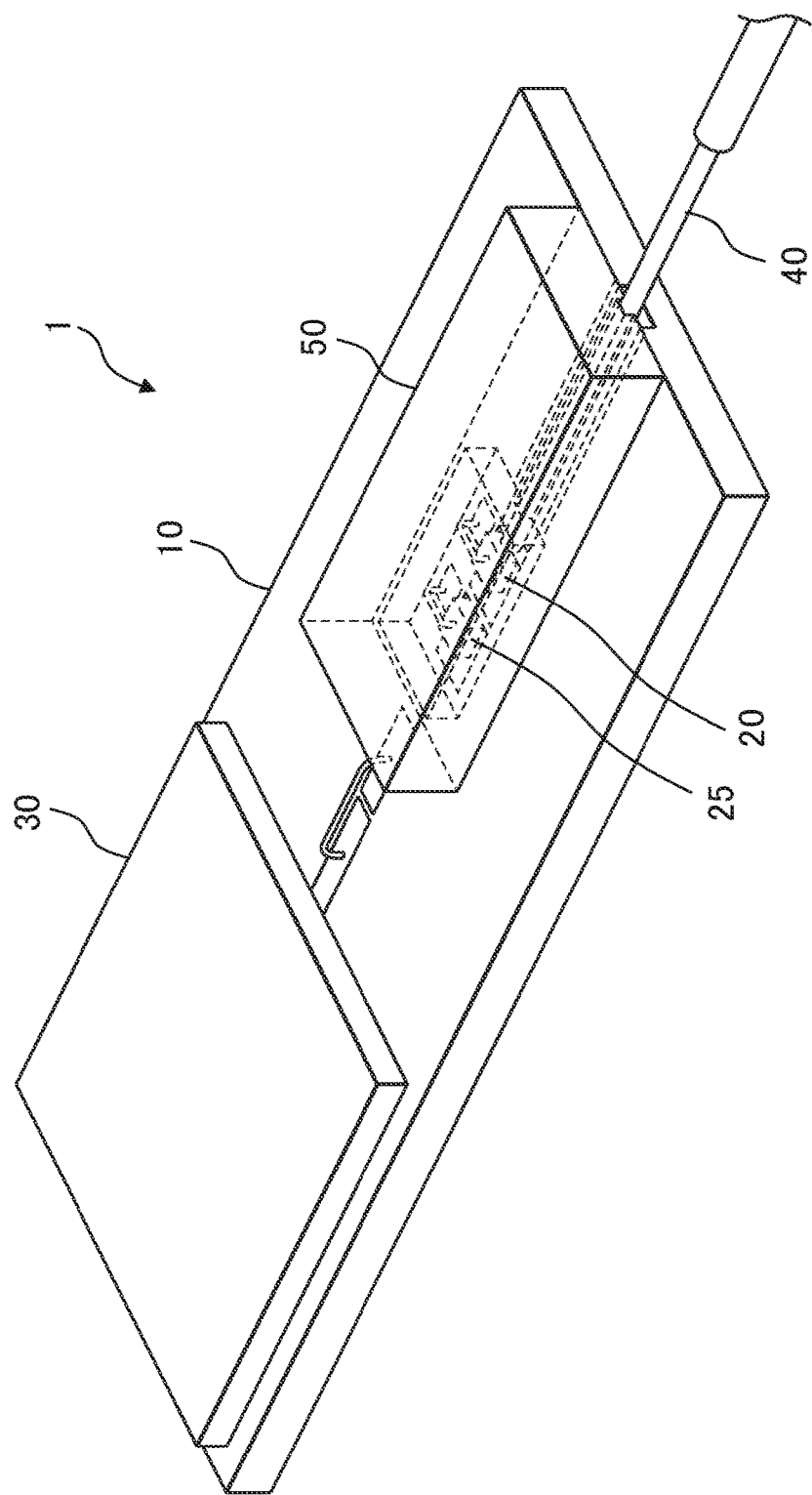
FIG. 1 is a perspective view schematically illustrating the structure of an optical module 1.

FIG. 1 is a perspective view schematically illustrating the structure of an optical module 1. The optical module 1 includes, as major component elements, a Si platform 10, an LD device 20, a PD device 25, a driver IC 30, an optical fiber 40, and a sub-substrate 50. The optical module 1 is an integrated laser module constructed by mounting the LD device 20, driver IC 30, optical fiber 40, sub-substrate 50, etc., on the Si platform 10 which is a silicon substrate.

The Si platform 10 is one example of a mounting substrate, and has a size measuring, for example, a dozen or so millimeters square. The Si platform 10 is formed with through-silicon vias (TSVs) passing through from the top to the bottom thereof. With these TSVs, interconnect lines from the LD device 20, PD device 25, etc., are connected to an internal interconnect layer or to the back of the Si platform 10. The Si platform 10 is mounted on a circuit substrate (not shown) provided to supply electrical signals to the LD device 20, driver IC 30, etc. The electrical signals are supplied from the circuit substrate to the various devices, such as the LD device 20 and the driver IC 30, via the TSVs.

The LD device (laser device) 20 is a laser diode that emits red, green, or blue laser light. Alternatively, when using the optical module 1, for example, for eye tracking or depth sensing, a laser diode that emits near-infrared laser light at 780 nm to 1300 nm, for example, is used as the LD device 20. The LD device 20 is mounted on the upper surface of the Si platform 10 by surface activated bonding after the driver IC 30 has been mounted by soldering or the like. The LD device 20 is mounted junction-down (face-down) with its active layer facing the Si platform 10 in order to improve its heat dissipation characteristics and to position the device with high precision by using the surface of the Si platform 10 as a reference surface. As a result, the p-electrode and n-electrode of the LD device 20 are disposed on the mounting side facing the Si platform 10 and on the opposite side, respectively.

The PD device 25 is a photodiode that receives backward light from the LD device 20 and that monitors the amount of the received light. The PD device 25 is located rearwardly of the LD device 20 as viewed along the laser light emitting direction of the LD device 20. The PD device 25 is mounted on the Si platform 10 by soldering.

The driver IC 30 is an electronic component for driving the LD device 20, and includes at least the function of controlling the supply of current to the LD device 20. The driver IC 30 preferably includes a digital interface, and more preferably includes a core unit such as a CPU and memory as a control unit. The driver IC 30 has a size measuring, for example, about several millimeters square, and is mounted on the Si platform 10 by soldering.

The optical fiber 40 is, for example, a single-mode fiber (SMF) through which the laser light emitted from the LD device 20 is guided. The optical fiber 40, which is fixed to the sub-substrate 50, is fixedly secured to the Si platform 10 via the sub-substrate 50. A GI (Graded Index) lens as a coupling member may be provided integrally at the end of the optical fiber 40 that faces the LD device 20. Instead of providing the optical fiber 40, a planar optical waveguide, for example, may be formed on the Si platform 10, and the laser light from the LD device 20 may be guided through the optical waveguide.

Figure 2A:
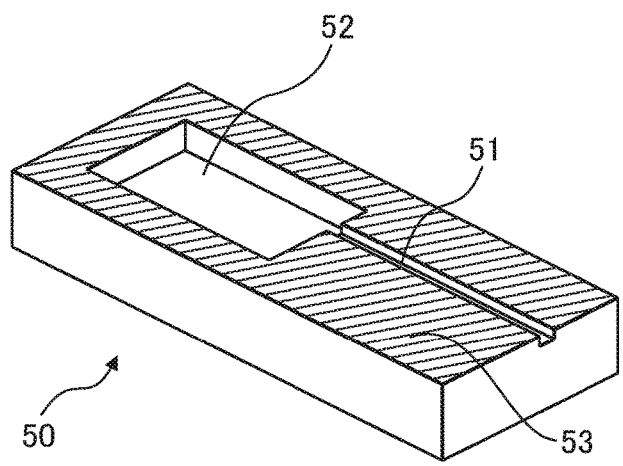
FIG. 2A is a perspective view of the sub-substrate 50.
Figure 2B:
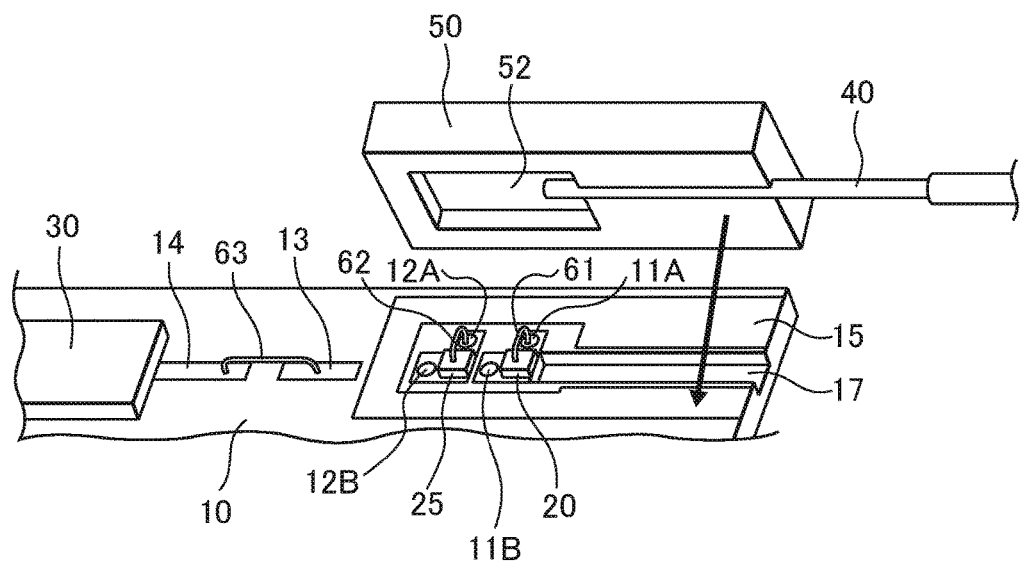
FIG. 2B is a perspective view of the sub-substrate 50.
Figure 3A:
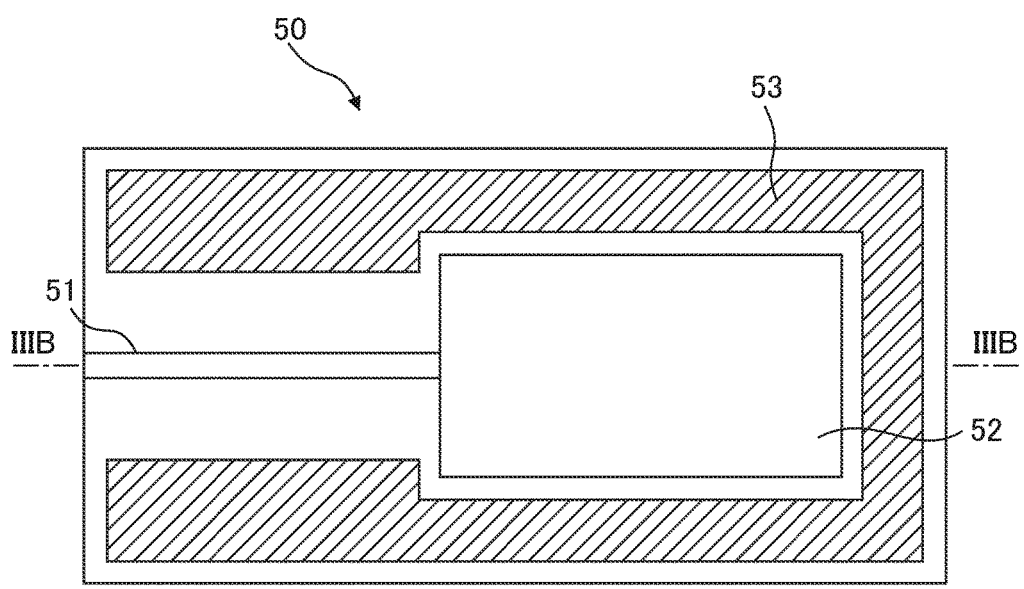
FIG. 3A is a top plan view of the sub-substrate 50.
Figure 3B:
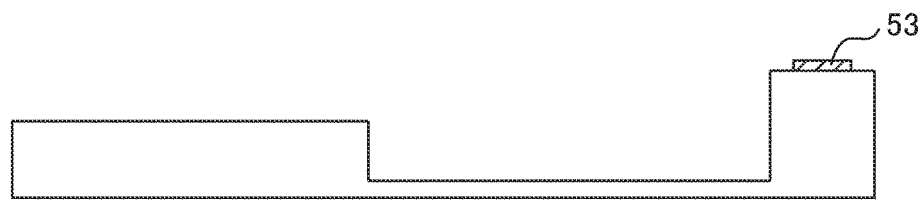
FIG. 3B is a cross-sectional view of the sub-substrate 50.

FIGS. 2A and 2B are perspective views of the sub-substrate 50. FIG. 3A is a top plan view of the sub-substrate 50, and FIG. 3B is a cross-sectional view of the sub-substrate 50 taken along line IIIB-IIIB. In FIGS. 2A and 2B, the sub-substrate 50 is shown with its bonding surface to the Si platform 10 facing up.

The sub-substrate 50 is one example of a mounting component formed from silicon for optically coupling the LD device 20 to the optical fiber 40 by being bonded to the Si platform 10 on which the LD device 20 is mounted. The sub-substrate 50 functions not only as a component for fixedly holding the optical fiber 40, but also as a cover for packaging optical components such as the LD device 20 and the PD device 25.

As shown in FIG. 2A, a groove portion 51, a recessed portion 52, and a metallic film 53 are formed on the sub-substrate 50. The groove portion 51 is a groove for fixedly holding the optical fiber 40 so that the core of the optical fiber 40 is positioned at a predetermined depth with respect to the bonding surface to be bonded to the Si platform 10, and is formed in the bonding surface to be bonded to the Si platform 10. The recessed portion 52 is a recess for accommodating the LD device 20 and PD device 25, and is formed continuous with the groove portion 51. The shape of the recessed portion 52 is not limited to the rectangular box shape illustrated here. The metallic film 53 is a film formed, for example, from Au (gold) for surface-activated bonding the sub-substrate 50 to the Si platform 10, and is formed on the bonding surface to be bonded to the Si platform 10.

As shown in FIG. 2B, the sub-substrate 50 is mounted on the Si platform 10 so that the bonding surface on which the metallic film 53 is formed faces down.

FIG. 2B also shows some of the electrode pads used for interconnecting the electrodes of the LD device 20, PD device 25, and driver IC 30, respectively. The n-electrode of the LD device 20 is connected to an LD electrode pad 11A via a wire bond 61, and the p-electrode is connected to an LD electrode pad 11B. The n-electrode of the PD device 25 is connected to a PD electrode pad 12A via a wire bond 62, and the p-electrode is connected to a PD electrode pad 12B. These electrode pads are connected to a connection pad 13 via TSVs (not shown) formed in the Si platform 10 and via electrode pads formed on the back surface of the Si platform 10. The connection pad 13 is connected to the driver IC 30 via a wire bond 63 and a driver electrode pad 14.

Reference numeral 15 on the upper surface of the Si platform 10 in FIG. 2B designates a bonding portion to be bonded to the sub-substrate 50. A groove portion 17 (fiber escape groove) for accommodating the optical fiber 40 is formed in the upper surface of the Si platform 10 in a position that overlaps the groove portion 51 of the sub-substrate 50 when the sub-substrate 50 is bonded thereon.

As shown in FIGS. 3A and 3B, the recessed portion 52 is formed to a greater depth than the groove portion 51, as measured from the bonding surface to be bonded to the Si platform 10, thus forming a two-stepped recessed structure on the sub-substrate 50.

The depth of the groove portion 51 is strictly controlled so that, when the sub-substrate 50 is bonded to the Si platform 10, the distance from the bonding surface of the sub-substrate 50 bonded to the Si platform 10 to the center of the core of the optical fiber 40 becomes equal to a predetermined value. This depth control is realized by using an SOI (Silicon on Insulator) layer as a stopper layer when forming the groove portion 51 in the sub-substrate 50, as will be described later. In this way, a structure for aligning the optical fiber 40 in the vertical direction (z direction) is incorporated into the sub-substrate 50 itself.

On the other hand, the depth of the recessed portion 52 need not necessarily be strictly controlled, because it is a recess simply formed for accommodating the LD device 20 and PD device 25.

The thickness of the sub-substrate 50 must be made large enough to be able to protect the LD device 20 when the LD device 20 is accommodated in the recessed portion 52 by placing the bonding surface of the sub-substrate 50 in contact with the Si platform 10, but must not be made too large so that the position of the LD device 20 can be detected using the infrared transmission image. Since, generally, the optical fiber 40 has a diameter of about 125 µm, it is difficult to make the sub-substrate thinner than that. Accordingly, the thickness of the sub-substrate 50 must be 200 µm at minimum, and considering the strength that can withstand the load applied when mounting, it is preferable that the sub-substrate 50 has a thickness of 300 µm or greater.

Since silicon is highly transmissive to infrared light, the interior can be observed using the transmission image even if the sub-substrate 50 is as thick as about 1 mm. However, if the thickness of the sub-substrate 50 is made 1 mm or greater, the number of wafers that can be sliced from an ingot when fabricating the sub-substrate 50 decreases, increasing the fabrication cost. Further, in the case of a commonly available infrared camera that uses a silicon-based detector and is constructed with a CMOS or CCD sensor, the sensitivity rapidly drops in the wavelength region longer than 850 nm. The maximum thickness of the sub-substrate 50 through which the transmission image can be observed using illuminating light of 850 nm or shorter is about 850 µm. If the thickness is greater than that, an expensive infrared camera that uses an InGaAs sensor having sensitivity on the longer wavelength side needs to be used in combination with near-infrared illumination of longer wavelengths.

Accordingly, while the sub-substrate 50 can be chosen to have a thickness in the range of 200 to 1000 µm, the thickness in the range of 300 to 800 µm is preferable when the strength, the fabrication cost, etc., are considered.

FIG. 4A is a longitudinal cross-sectional view showing a portion of the optical module 1. As shown in FIG. 4A, in addition to the bonding portion 15 to be bonded to the sub-substrate 50, a bonding portion 16 to be bonded to the LD device 20 is formed on the surface of the Si platform 10. A metallic film 21 formed, for example, from Au (gold), similar to the metallic film 53 formed on the bottom surface of the sub-substrate 50, is formed on the bottom surface of the LD device 20.

FIG. 4B is an enlarged view of a portion of the bonding portion 15. In the bonding portions 15 and 16, micro-bumps (hereinafter simply referred to as the "bumps"), each being a tiny protrusion with a diameter of several microns formed, for example, from a metallic material such as gold (Au), are arranged at a prescribed pitch. In FIGS. 4A and 4B, these bumps (bumps 15A) are exaggerated for illustrative purposes.

The surfaces of the bumps of the bonding portions 15 and 16 and the surfaces of the metallic films 53 and 21 are activated by cleaning them with Ar plasma prior to bonding. Then, when bonding, the sub-substrate 50 and the LD device 20 are placed on the respective bonding portions 15 and 16 of the Si platform 10, and a load is applied at normal temperature. In this way, the metallic films 53 and 21 are respectively brought into contact with the upper surfaces of the bumps of the bonding portions 15 and 16, and the bumps are crushed, causing the interdiffusion of metal atoms to occur between the bumps and the metallic films 53 and 21. By thus utilizing the adhesion forces acting between the atoms, the sub-substrate 50 and the LD device 20 are surface-activated bonded to the respective bonding portions 15 and 16 of the Si platform 10.

Since this surface activated bonding process does not require any special heating, component displacements due to the residual stress arising from the differences in thermal expansion coefficient are difficult to occur, and therefore the sub-substrate 50 and other components to be bonded can be highly precisely positioned and mounted. In the optical module 1, when forming the groove portion 51 of the sub-substrate 50, its depth is controlled, as earlier described, and when bonding the sub-substrate 50, the load applied to it is also controlled, thereby making it possible to align the position of the optical fiber 40 more strictly in the vertical direction.

For convenience of explanation, the directions parallel to the bonding surface between the Si platform 10 and the sub-substrate 50 will hereinafter be referred to as the x and y directions and the direction normal to the bonding surface of the two substrates as the z direction. In particular, the direction in which the optical fiber 40 fixedly secured to the Si platform 10 extends is taken as the y direction.

Figure 5:
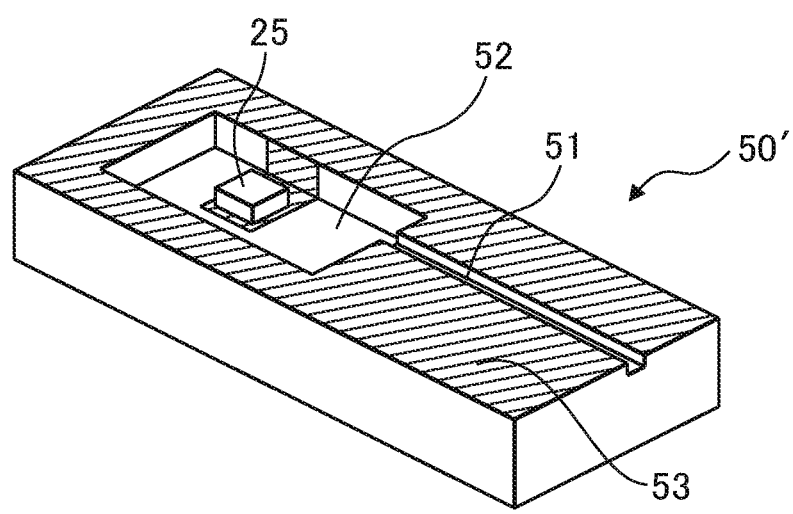
FIG. 5 is a perspective view of a sub-substrate 50'.

FIG. 5 is a perspective view of a sub-substrate 50'. In the optical module 1, the PD device 25 is mounted on the Si platform 10, but alternatively, the PD device 25 may be mounted on a surface of the recessed portion 52 of the sub-substrate 50', as shown in FIG. 5. In that case, the metallic film 53 for surface activated bonding is also used as a conductive pattern for the PD device 25.

FIGS. 6A to 7D are diagrams for explaining an example of a fabrication process for the sub-substrate 50. The diagrams each show a top plan view and a longitudinal cross-sectional view, similar to those shown in FIGS. 3A and 3B, and illustrate the sub-substrate 50 at various stages in the fabrication process.

Figure 6A:
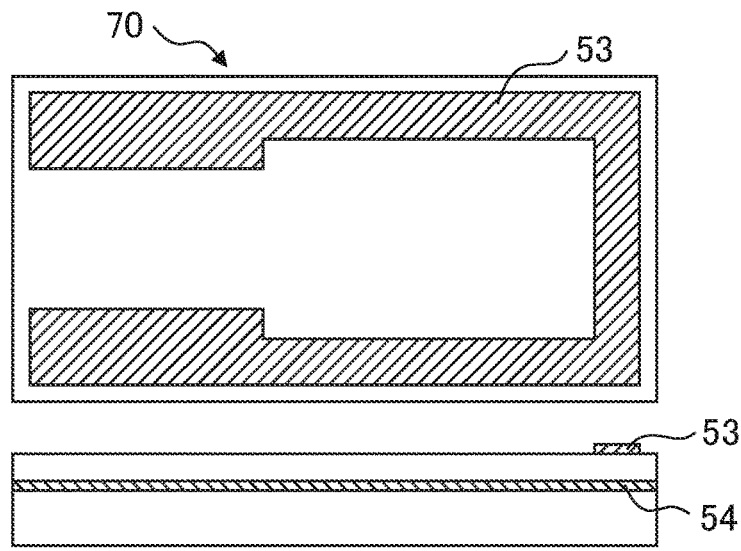
FIG. 6A is a diagram for explaining an example of a fabrication process for the sub-substrate 50.
Figure 6B:
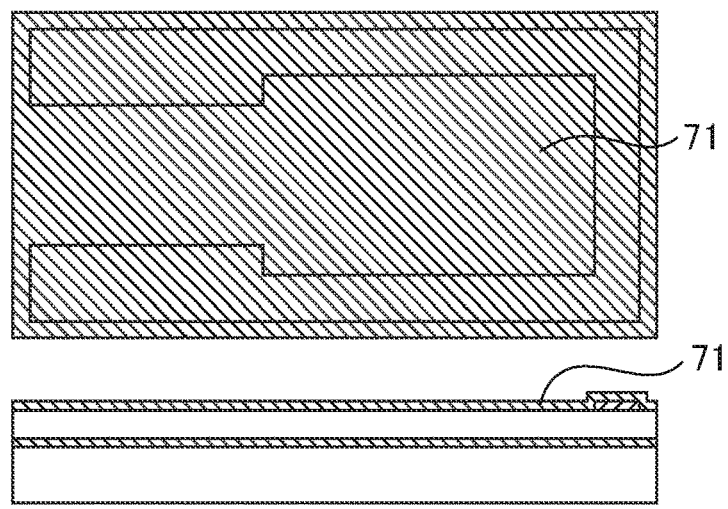
FIG. 6B is a diagram for explaining an example of a fabrication process for the sub-substrate 50.
Figure 6C:
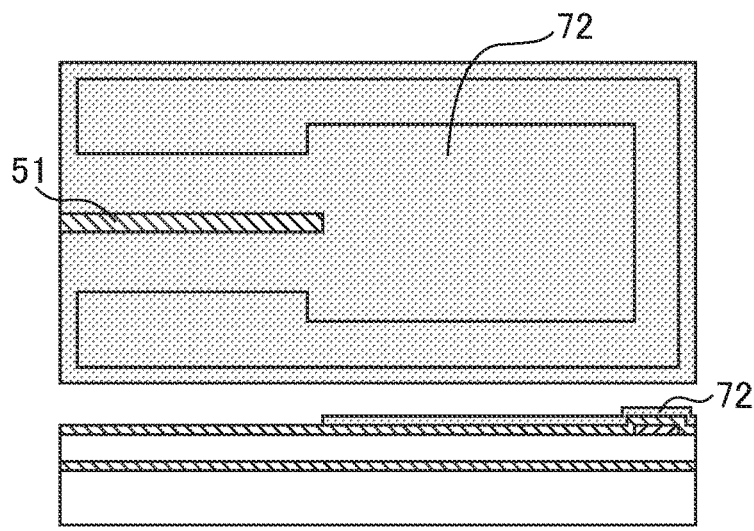
FIG. 6C is a diagram for explaining an example of a fabrication process for the sub-substrate 50.
Figure 6D:
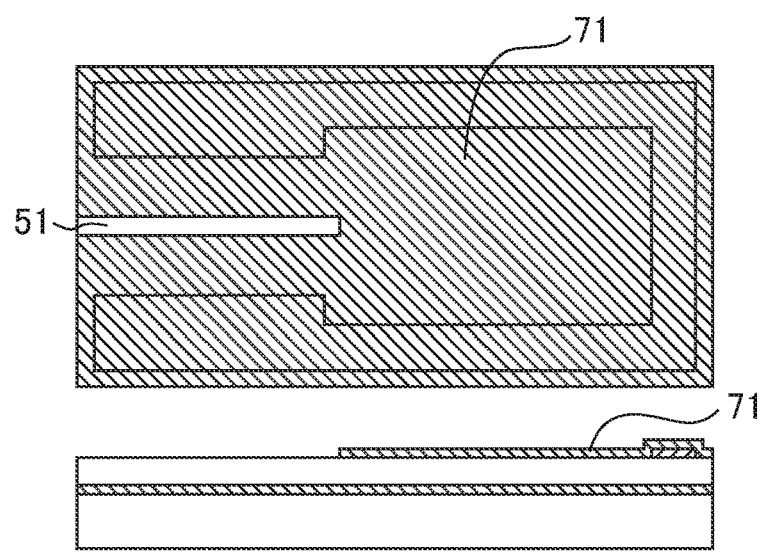
FIG. 6D is a diagram for explaining an example of a fabrication process for the sub-substrate 50.

First, as shown in FIG. 6A, a silicon substrate 70 containing an SOI stopper layer 54 implemented by SOI (silicon-on-insulator) is prepared, and the metallic film 53 is patterned on the substrate surface. Then, the silicon substrate 70 is heated in an oxidizing atmosphere to form an SiO$_2$ (silicon dioxide) film 71 on the upper surface of the silicon substrate 70, as shown in FIG. 6B. Further, as shown in FIG. 6C, a resist 72 is formed everywhere on the upper surface of the silicon substrate 70, except the portion where the groove portion 51 is to be formed. Next, as shown in FIG. 6D, the SiO$_2$ film 71 on the groove portion 51 where the resist 72 is not formed is removed by wet etching or dry etching.

Figure 7A:
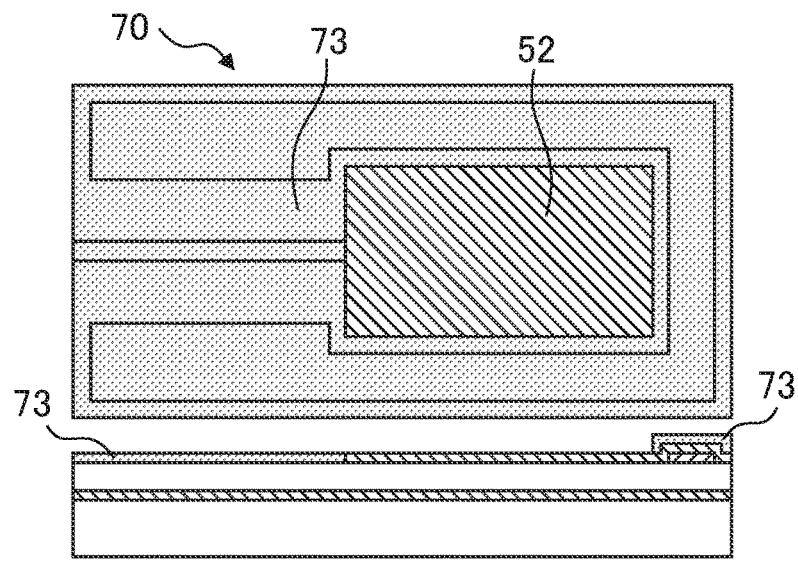
FIG. 7A is a diagram for explaining an example of a fabrication process for the sub-substrate 50.
Figure 7B:
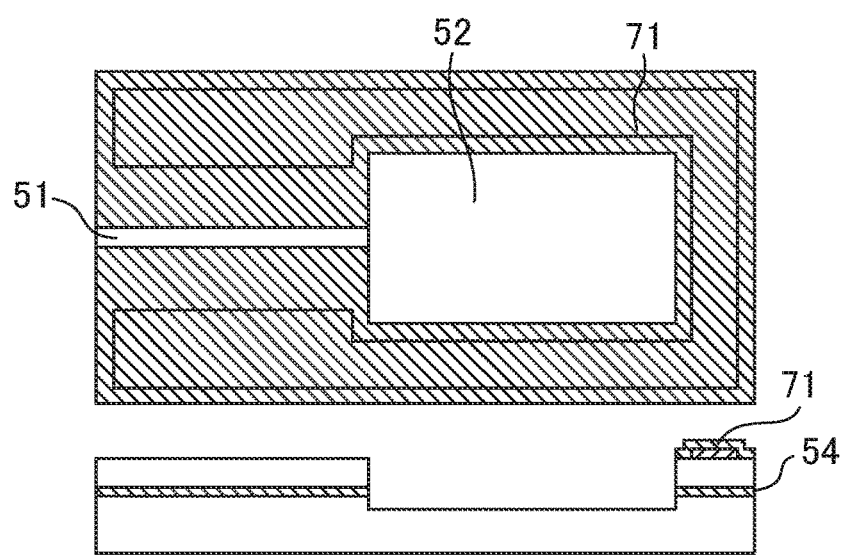
FIG. 7B is a diagram for explaining an example of a fabrication process for the sub-substrate 50.
Figure 7C:
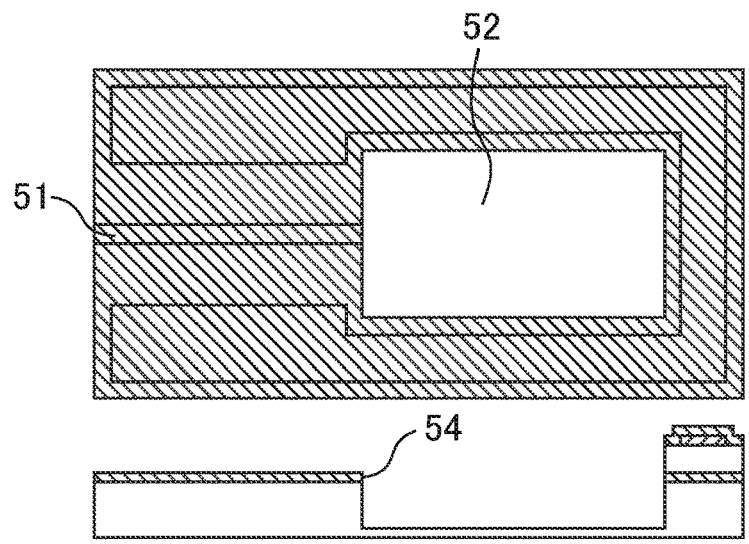
FIG. 7C is a diagram for explaining an example of a fabrication process for the sub-substrate 50.
Figure 7D:
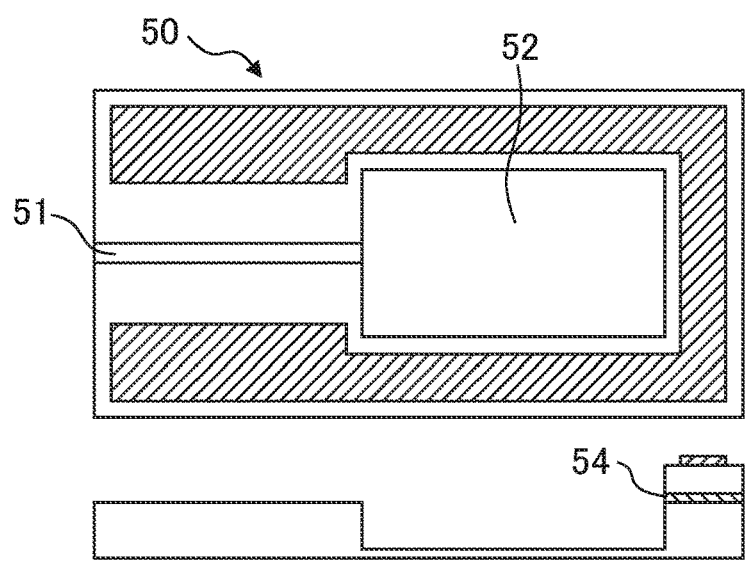
FIG. 7D is a diagram for explaining an example of a fabrication process for the sub-substrate 50.

Subsequently, as shown in FIG. 7A, a resist 73 is formed everywhere on the upper surface of the silicon substrate 70, except the portion where the recessed portion 52 is to be formed. Next, the SiO$_2$ film 71 on the recessed portion 52 is removed by wet etching or dry etching and, using a D-RIE technique, the silicon inside the recessed portion 52 is removed by etching it to a depth deeper than the SOI stopper layer 54, as shown in FIG. 7B. Then, the resist 73 is removed to expose the SiO$_2$ film 71 except where the recessed portion 52 and the groove portion 51 are formed. Next, using D-RIE, the groove portion 51 is etched down to the SOI stopper layer 54, as shown in FIG. 7C. At this time, the recessed portion 52 not masked is also etched by D-RIE. Finally, as shown in FIG. 7D, the SOI stopper layer 54 in the groove portion 51 and the SiO$_2$ film 71 remaining in other portions are removed by wet etching or dry etching.

The fabrication of the sub-substrate 50 is thus completed. In the groove portion 51 of the completed sub-substrate 50, it is seen that the silicon is etched away from the bonding surface to be bonded to the Si platform 10 down to the SOI stopper layer 54. Further, in the recessed portion 52, it is seen that the silicon is removed away from the bonding surface down to a depth deeper than the SOI stopper layer 54.

Figure 8:
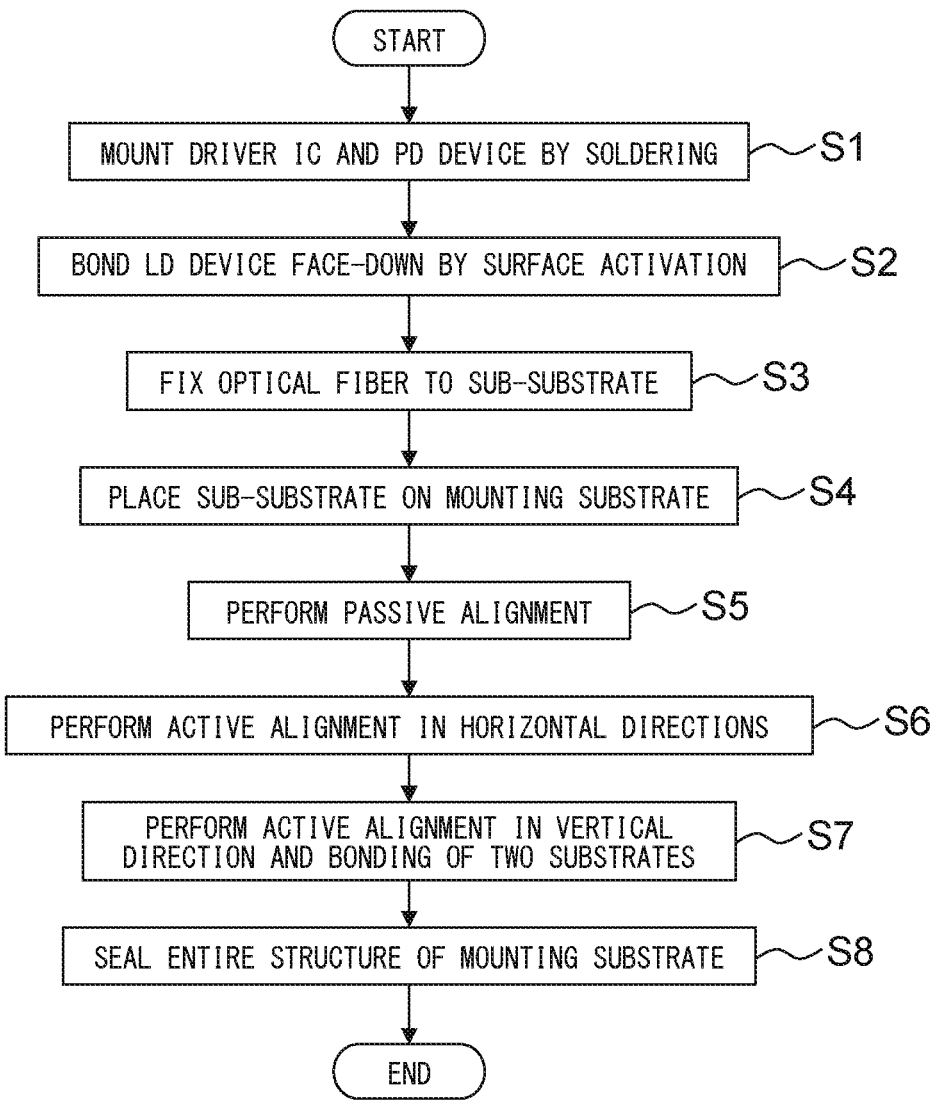
FIG. 8 is a flowchart illustrating an example of a fabrication process of the optical module 1.

FIG. 8 is a flowchart illustrating an example of a fabrication process of the optical module 1.

First, the driver IC 30 and the PD device 25 are mounted on the Si platform by soldering (S1). After that, the LD device 20 is bonded face-down to the upper surfaced of the Si platform 10 by passive alignment and surface activation (S2). At this time, the position of the LD device 20 relative to the Si platform 10 is determined, for example, by registering the alignment marks (not shown) provided on the Si platform 10 and the LD device 20 with respect to each other. By thus performing the surface activated bonding after the soldering is done, the LD device 20 can be mounted without subjecting the LD device 20 to the soldering heat.

Next, a single-mode fiber (SMF) fitted at its end with a GI lens for enhancing the coupling efficiency, for example, is fixed as the optical fiber 40 into the groove portion 51 of the sub-substrate 50 (S3). Then, the sub-substrate 50 is placed on the Si platform 10 by bringing the bonding surface into contact with the Si platform 10 so that the LD device 20 mounted on the Si platform 10 is accommodated in the recessed portion 52 (S4).

Figure 9:
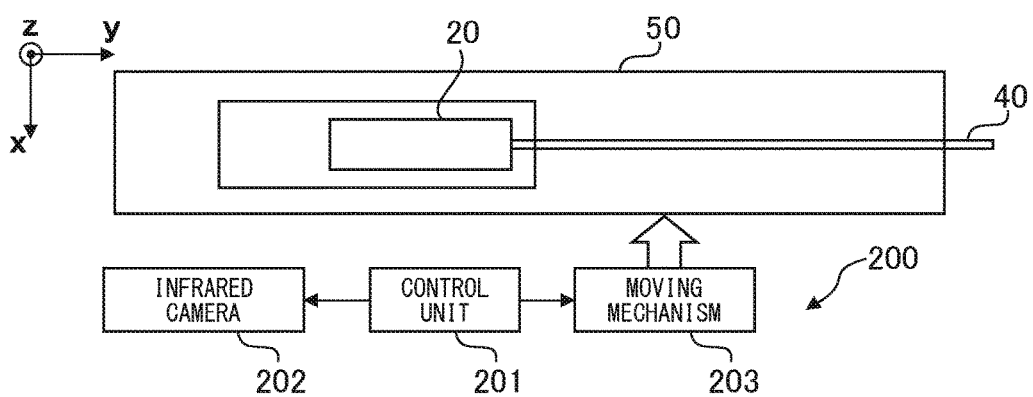
FIG. 9 is a diagram schematically illustrating the configuration of the alignment equipment 200.

Next, passive alignment between the LD device 20 and the optical fiber 40 is performed by using alignment equipment 200 shown in FIG. 9 (S5).

FIG. 9 is a diagram schematically illustrating the configuration of the alignment equipment 200. The alignment equipment 200 includes a control unit 201, an infrared camera 202, and a moving mechanism 203. The control unit 201 is constructed, for example, from a PC which includes a CPU, memory, etc. The infrared camera 202 captures an image of the sub-substrate 50 with the LD device 20 accommodated in the recessed portion 52, and supplies the acquired infrared image data to the control unit 201. The moving mechanism 203 moves the sub-substrate 50 placed on the Si platform 10 in the horizontal plane as well as in the vertical direction under the control of the control unit 201.

When performing the passive alignment, the control unit 201 acquires an infrared image of the sub-substrate 50 captured by the infrared camera 202 while holding the LD device 20 off. Then, the control unit 201 detects positions, such as the position of the LD device 20 and the positions of the alignment marks provided on the Si platform 10 and sub-substrate 50, from the infrared transmission image, and determines the amount by which the sub-substrate 50 needs to be moved. By controlling the moving mechanism 203 based on the thus determined amount of movement, the control unit 201 adjusts the position of the sub-substrate 50 so that the positions of the alignment marks provided thereon are aligned to the positions of the corresponding alignment marks provided on the Si platform 10.

Figure 10B:
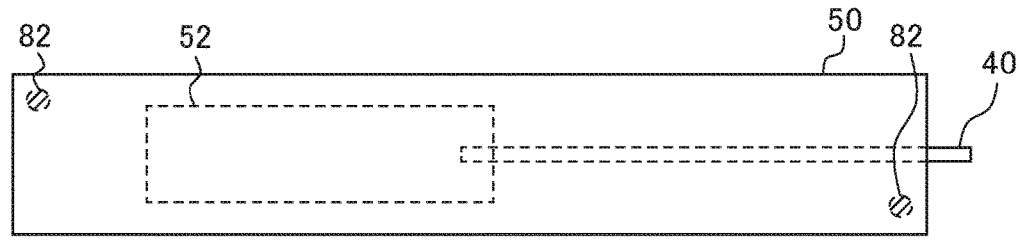
FIG. 10B is a diagram showing, by way of example, the alignment marks provided on the sub-substrate 50.

FIG. 10A is a diagram showing, by way of example, the alignment marks provided on the Si platform 10. FIG. 10B is a diagram showing, by way of example, the alignment marks provided on the sub-substrate 50. FIG. 10C is a diagram showing the Si platform 10 of FIG. 10A on which the sub-substrate 50 of FIG. 10B is placed. FIGS. 10A and 10B are top plan views of the Si platform 10 and the sub-substrate 50, respectively. In FIG. 10B, the sub-substrate 50 is shown as viewed from the side (top side) opposite to the bonding surface to be bonded to the Si platform 10.

The Si platform 10 and the sub-substrate 50 are each provided with two alignment marks which are located, for example, at diagonally opposed positions. As shown in FIGS. 10A and 10B, two Si platform-side marks 81 are provided on the upper surface of the Si platform 10, and two sub-substrate-side marks 82 are provided on the lower surface of the sub-substrate 50. The sub-substrate-side marks 82 are provided on the bonding surface to be bonded to the Si platform 10. The shape of each alignment mark is not limited to the circular shape shown here, but may be, for example, a rectangular shape. When performing the passive alignment, the alignment equipment 200, based on the infrared transmission image acquired by the infrared camera 202, determines the position of the sub-substrate 50 relative to the Si platform 10 so that the two Si platform-side marks 81 and the two sub-substrate-side marks 82 overlay each other, as shown in FIG. 10C.

Figure 11B:
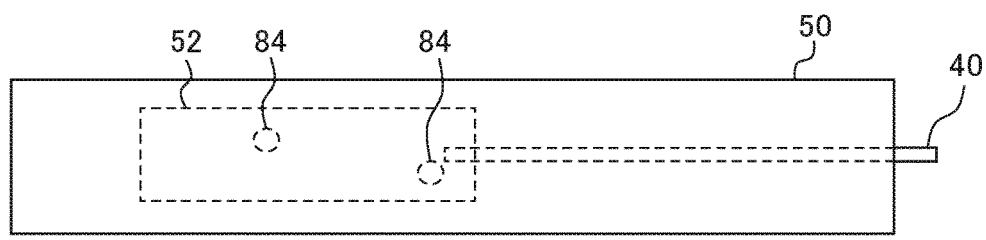
FIG. 11B is a diagram showing, by way of example, the alignment marks provided on the sub-substrate 50.
Figure 11C:
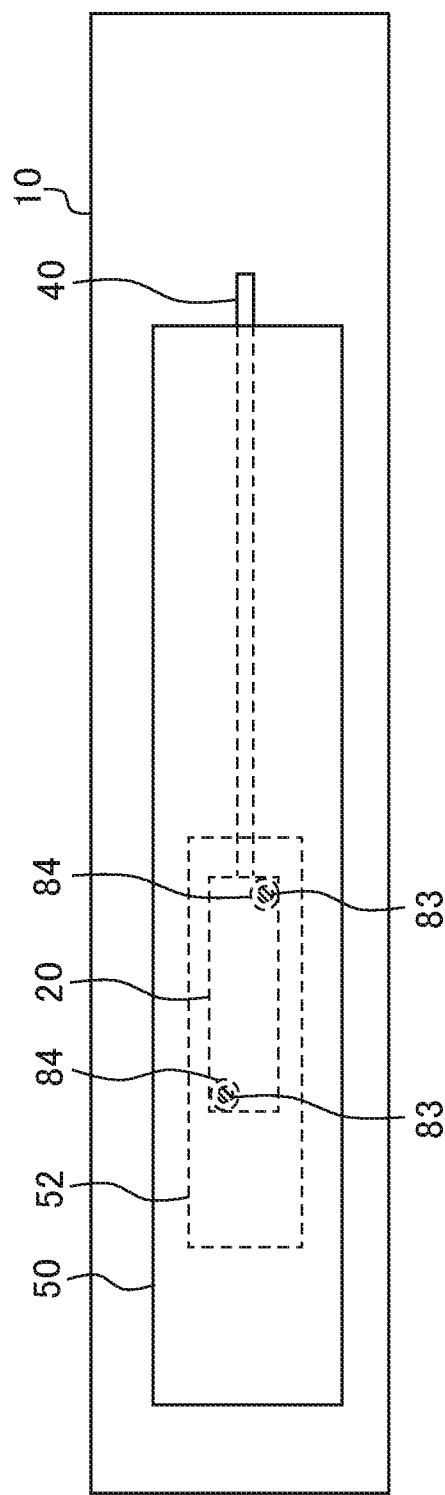
FIG. 11C is a diagram showing the Si platform 10 of FIG. 11A on which the sub-substrate 50 of FIG. 11B is placed.

FIG. 11A is a diagram showing, by way of example, the alignment marks provided on the LD device 20. FIG. 11B is a diagram showing, by way of example, the alignment marks provided on the sub-substrate 50. FIG. 11C is a diagram showing the Si platform 10 of FIG. 11A on which the sub-substrate 50 of FIG. 11B is placed. These diagrams show top plan views corresponding to FIGS. 10A to 10C, respectively. As shown in FIGS. 11A and 11B, the alignment marks used for the passive alignment may be provided on the LD device 20 and the sub-substrate 50, not on the Si platform 10 and the sub-substrate 50.

In this case also, the LD device 20 and the sub-substrate 50 are each provided with two alignment marks which are located, for example, at diagonally opposed positions. As shown in FIGS. 11A and 11B, two LD-side marks 83 are provided on the upper surface of the LD device 20, and two sub-substrate-side marks 84 are provided on the bottom surface of the recessed portion 52 of the sub-substrate 50. When performing the passive alignment, the alignment equipment 200, based on the infrared transmission image acquired by the infrared camera 202, determines the position of the sub-substrate 50 relative to the Si platform 10 so that the two LD-side marks 83 and the two sub-substrate-side marks 84 overlay each other, as shown in FIG. 11C.

With the above passive alignment, the rough position of the sub-substrate 50 relative to the Si platform 10 in the horizontal directions (x and y directions) on the bonding surface is coarsely adjusted with micron-order precision. At this time, the relative position between the optical fiber 40 fixedly held in the groove portion 51 of the sub-substrate 50 and the LD device 20 mounted on the Si platform 10 is adjusted with a precision of several microns.

Figure 12:
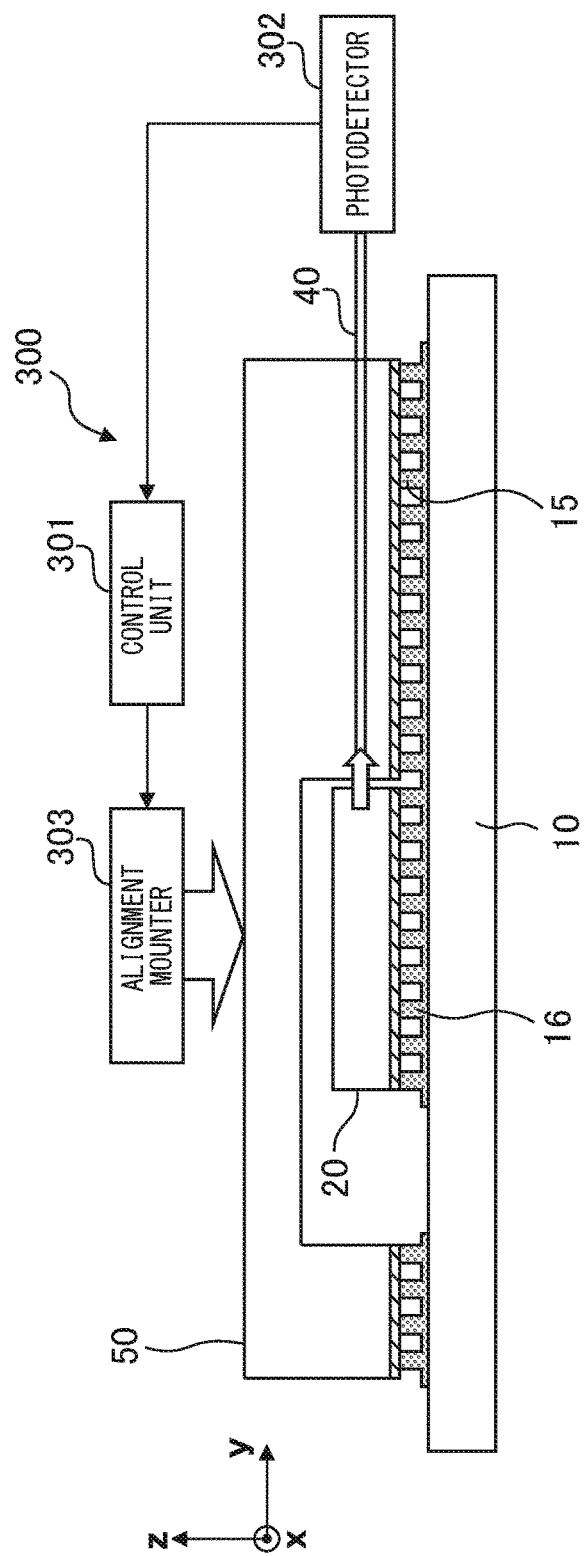
FIG. 12 is a diagram schematically illustrating the configuration of the alignment-mounting equipment 300.

Next, using alignment-mounting equipment 300 shown in FIG. 12, the LD device 20 and the optical fiber 40 are actively aligned in the horizontal directions (x and y directions) (S6).

FIG. 12 is a diagram schematically illustrating the configuration of the alignment-mounting equipment 300. The alignment-mounting equipment 300 includes a control unit 301, a photodetector 302, and an alignment mounter 303. The control unit 301 is constructed, for example, from a PC which includes a CPU, memory, etc. The photodetector 302 detects the intensity of laser light coupled into the optical fiber 40, and supplies a voltage proportional to the detected intensity to the control unit 301. The alignment mounter 303 applies a load to the mounting component under the control of the control unit 301 and thereby bonds the mounting component onto the Si platform 10.

When performing the active alignment, first the driver IC 30 drives the LD device 20 to emit laser light. At the same time, the control unit 301, using the photodetector 302, monitors the output voltage proportional to the intensity of the laser light emitted from the LD device 20 and coupled into the optical fiber 40. Then, while fine-adjusting the position of the sub-substrate 50 in submicron order in the horizontal directions using a moving mechanism (not shown), the control unit 301 determines the position of the sub-substrate 50 at which the output voltage of the photodetector 302 becomes maximum.

Next, using the alignment-mounting equipment 300, the LD device 20 and the optical fiber 40 are actively aligned in the vertical direction (z direction) (S7). At this time, the control unit 301, using the photodetector 302, detects the intensity of the laser light emitted from the LD device 20 and coupled into the optical fiber 40, and controls the load applied to the sub-substrate 50 by controlling the alignment mounter 303 while monitoring the output voltage. The bumps provided on the bonding portion 15 have a property such that when the load is applied, the bumps are deformed (crushed) and reduced in height and, when the load is removed, the shape is restored due to elastic restoring forces to a degree equal to the amount of elastic rebound. In view of this, when performing the active alignment in the vertical direction, the control unit 301 controls the alignment mounter 303 in such a manner that the load applied to the sub-substrate 50 is gradually increased and, after the output voltage from the photodetector 302 has reached a maximum value, the load is further increased by a prescribed amount and then the load is removed. The sub-substrate 50 is fixed in place by being bonded to the Si platform 10 by surface activation under the load applied by the alignment mounter 303.

As a result, when the load is being applied, the end of the optical fiber 40 is displaced by a prescribed amount from the light emitting center of the LD device 20 by being pushed deeper in the vertical direction, and when the load is removed, the fiber end returns to the position where it is most efficiently optically coupled to the light emitting center of the LD device 20. The amount of increase of the load described above depends on such factors as the alignment mounter 303, the shape of the sub-substrate 50 to which the load is applied, and the shape and material of the bumps of the bonding portion 15, and is calculated empirically.

Finally, the entire structure of the Si platform 10 is sealed with a resin or glass or like material (S8). The fabrication of the optical module 1 is thus completed.

As described above, in the optical module 1, not only is the LD device 20 protected but the optical fiber 40 is fixedly held in place by using the silicon sub-substrate 50 having the groove portion 51 for fixedly holding the optical fiber 40 and the recessed portion 52 for accommodating the LD device 20. Since the thickness of the sub-substrate 50 is chosen so that the position of the LD device 20 accommodated in the recessed portion 52 can be detected using a near-infrared transmission image, the LD device 20 and the optical fiber 40 in the optical module 1 can be centered and aligned with respect to each other while monitoring the transmission image through the cover of the sub-substrate 50. Accordingly, in the optical module 1, the LD device 20 and the optical fiber 40 can be aligned with higher precision while providing protection for the LD device 20 mounted on the substrate.

It is possible to use the sub-substrate 50 for dissipating the heat generated by the LD device 20, and it is also possible to form a hole in the sub-substrate 50 and bond the PD device 25 thereon. Further, as a modified example, the PD device 25 may be integrated on the Si platform 10, the structure being such that the laser light is monitored by confining the light within the space created in the sub-substrate 50.

Figure 13:
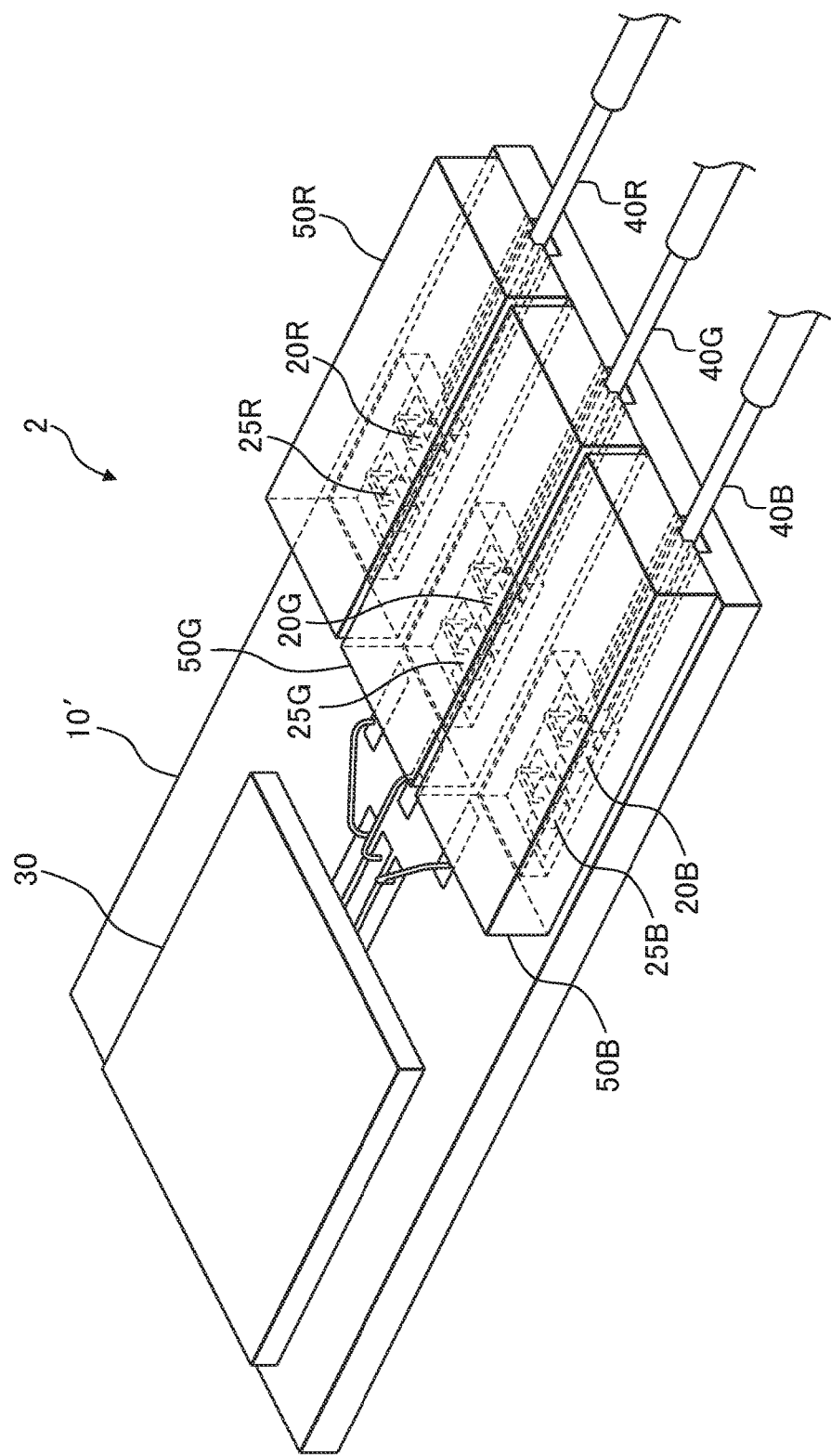
FIG. 13 is a perspective view schematically illustrating the structure of an optical module 2.

FIG. 13 is a perspective view schematically illustrating the structure of an optical module 2. The optical module 2 includes, as major component elements, a Si platform 10' (one example of a mounting substrate), LD devices 20R, 20G, and 20B, PD devices 25R, 25G, and 25B, a driver IC 30, optical fibers 40R, 40G, and 40B, and sub-substrates 50R, 50G, and 50B. While the optical module 1 is a laser light source that emits monochromatic laser light, the optical module 2 is a laser light source that emits laser light of red (R), green (G), and blue (B).

The LD devices 20R, 20G, and 20B are each a laser diode that emits laser light of red, green, or blue, respectively. The PD devices 25R, 25G, and 25B are each a photodiode that receives backward light from a corresponding one of the LD devices 20R, 20G, and 20B and that monitors the amount of the received light. Each of the optical fibers 40R, 40G, and 40B is, for example, a single-mode fiber (SMF) through which the laser light emitted from a corresponding one of the LD devices 20R, 20G, and 20B is guided.

The sub-substrates 50R, 50G, and 50B are each a fiber submount substrate similar to the one described with reference to FIGS. 2A to 3B, and one example of a mounting component. Each of the sub-substrates 50R, 50G, and 50B fixedly holds thereon a corresponding one of the optical fibers 40R, 40G, and 40B, and is placed on the Si platform 10' so as to accommodate a corresponding one of the LD devices 20R, 20G, and 20B and a corresponding one of the PD devices 25R, 25G, and 25B in its recessed portion.

Otherwise, the structure of the optical module 2 is the same as the structure of the optical module 1. In this way, a plurality of LD devices, one for each of the R, G, and B colors, may be mounted on a single mounting substrate, and a plurality of optical fibers, each for guiding the laser light emitted from a corresponding one of the devices, may be fixedly held on a plurality of sub-substrates, respectively, each being similar to the sub-substrate used in the optical module 1, while at the same time providing protection for each LD device.

In the optical module 2, the LD devices, PD devices, and optical fibers are provided for one set of RGB colors on the Si platform, but alternatively, the LD devices, PD devices, and optical fibers may be provided for a plurality of sets of RGB colors on a single Si platform. In this case also, the LD device, PD device, and optical fiber for each RGB color should be fixed or protected using a sub-substrate similar to the one used in the optical module 1.

Figure 14:
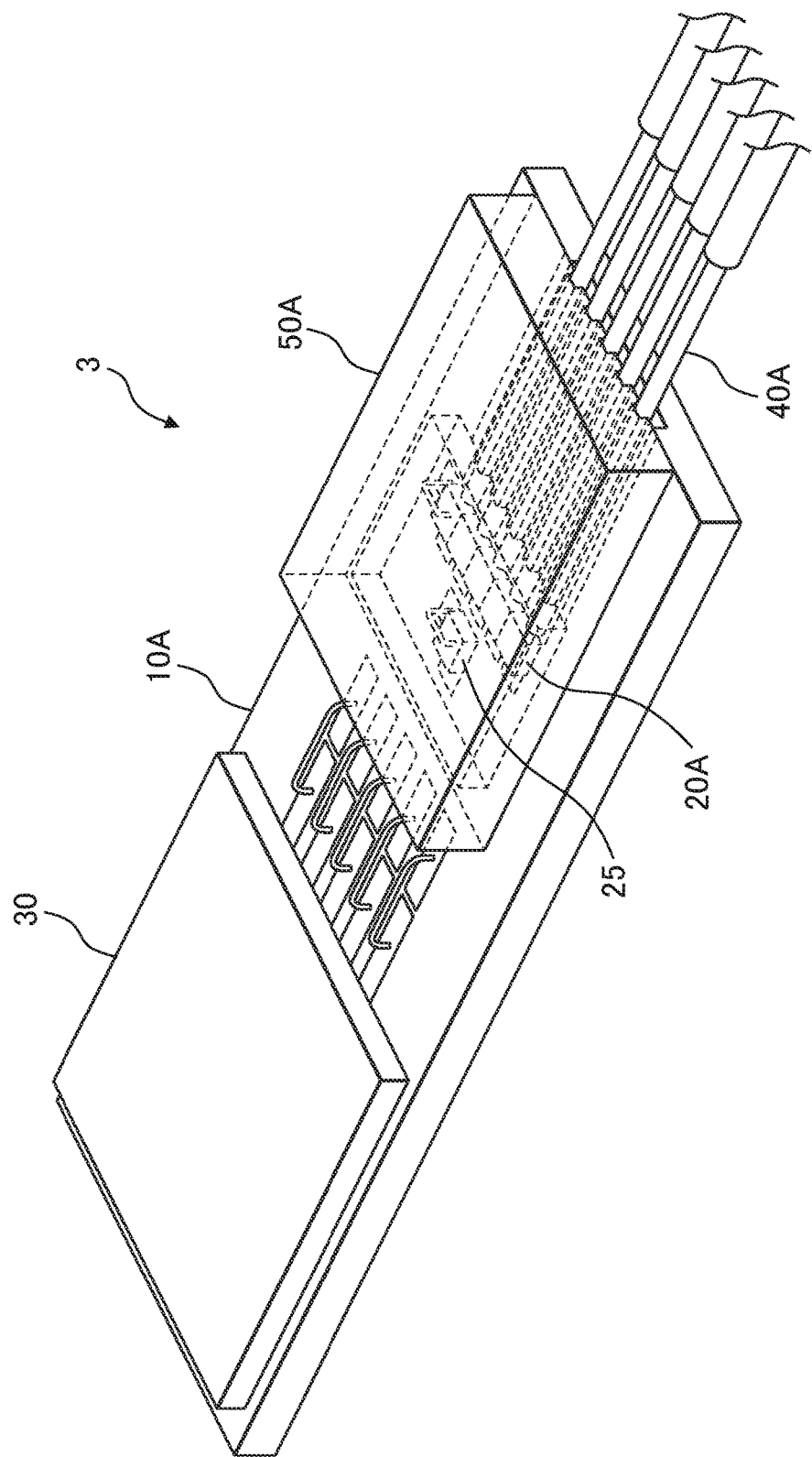
FIG. 14 is a perspective view schematically illustrating the structure of an optical module 3.

FIG. 14 is a perspective view schematically illustrating the structure of an optical module 3. The optical module 3 includes, as major component elements, a Si platform 10A (one example of a mounting substrate), an LD array 20A, a PD device 25, a driver IC 30, an optical fiber array 40A, and a sub-substrate 50A. In the optical module 1, the laser light from a single LD device is optically coupled into a single optical fiber, but in the optical module 3, the laser light from the LD array is optically coupled into a plurality of optical fibers.

The sub-substrate 50A is a fiber submount substrate similar to the one described with reference to FIGS. 2A to 3B, and one example of a mounting component. However, the sub-substrate 50A differs from the sub-substrate 50 of the optical module 1 by the inclusion of a plurality of groove portions the number of which is equal to the number of optical fibers contained in the optical fiber array 40A. The sub-substrate 50A fixedly holds thereon the optical fibers contained in the optical fiber array 40A, and is placed on the Si platform 10A so as to accommodate the LD array 20A and the PD device 25 in its recessed portion.

Otherwise, the structure of the optical module 3 is the same as the structure of the optical module 1. In this way, a plurality of LD devices (LD array) may be mounted on a single mounting substrate, and a plurality of optical fibers, each for guiding the laser light emitted from a corresponding one of the LD devices, may be fixedly held on a single sub-substrate, while at the same time providing protection for each LD device.

Figure 15A:
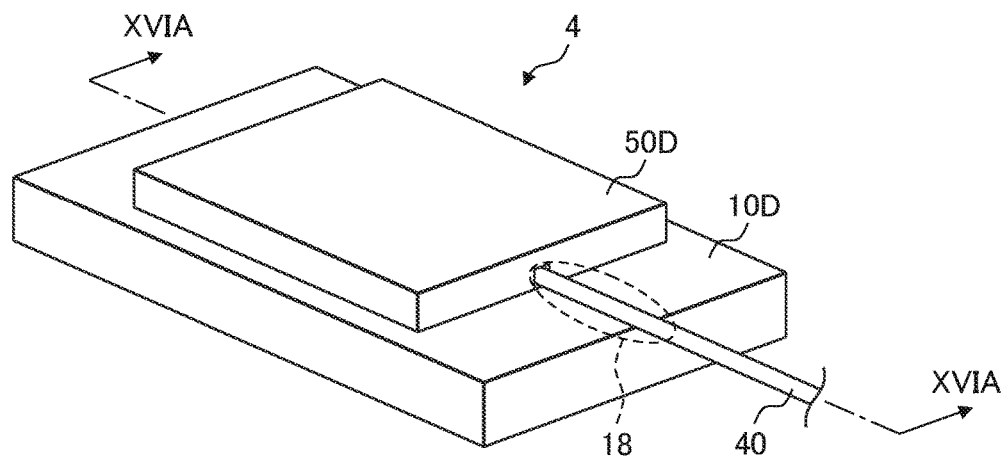
FIG. 15A is a perspective view schematically illustrating the structure of an optical module 4.
Figure 15B:
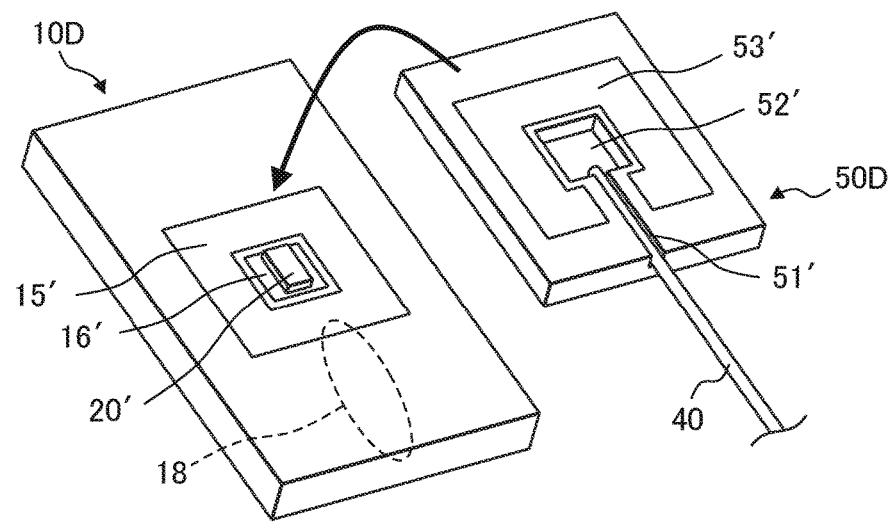
FIG. 15B is an exploded perspective view of the optical module 4.
Figure 16A:
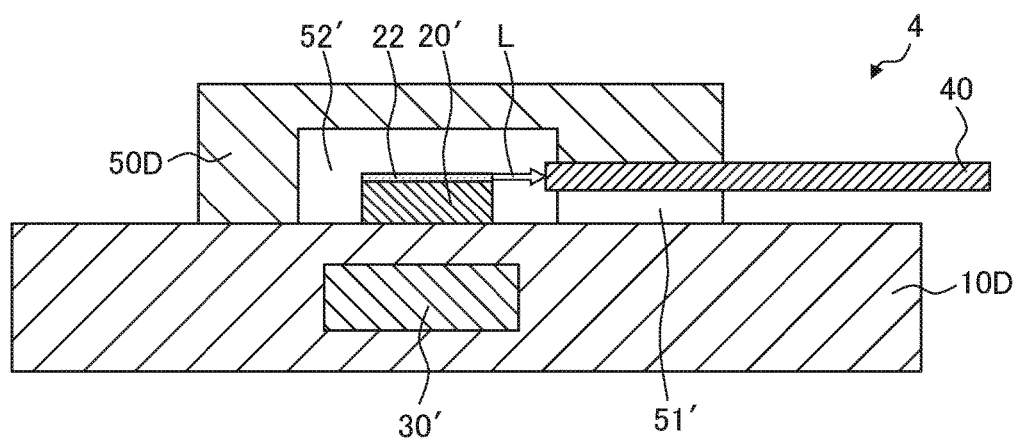
FIG. 16A is a cross-sectional view for comparing the optical modules 4 and 1.

FIG. 15A is a perspective view schematically illustrating the structure of an optical module 4, and FIG. 15B is an exploded perspective view of the optical module 4. FIGS. 16A and 16B are cross-sectional views for comparing the optical modules 4 and 1. FIG. 16A shows a cross section of the optical module 4 taken along line XVIA-XVIA in FIG. 15A, and FIG. 16B shows a cross section of the optical module 1 corresponding to FIG. 16A.

The optical module 4 includes, as major component elements, a Si platform 10D, an LD device 20', a driver IC 30', an optical fiber 40, and a sub-substrate 50D. The optical module 4 differs from the other optical modules 1 to 3 in that the LD device 20' is mounted junction-up and in that the driver IC 30' is built into the Si platform 10D.

The Si platform 10D is one example of a mounting substrate and, similarly to the Si platform 10 of the optical module 1, includes bonding portions 15' and 16' for bonding together the LD device 20' and the sub-substrate 50D by surface activation and an electrode structure (not shown) for connecting the LD device 20' to the driver IC 30'. However, the Si platform 10D is a flat substrate and, as indicated at reference number 18 in FIGS. 15A and 15B, does not include any structure corresponding to the groove portion 17 (fiber escape groove) formed in the Si platform 10 of the optical module 1.

The LD device 20' is a laser diode similar to the LD device 20 used in the optical module 1. However, unlike the optical module 1 in which the LD device 20 is mounted junction-down with its active layer 22 facing the Si platform 10, the LD device 20' in the optical module 4 is mounted junction-up with its active layer 22 facing the side opposite to the Si platform 10D, as can be seen from FIGS. 16A and 16B. An arrow L in FIGS. 16A and 16B indicates the laser light emitted from the LD device 20 or 20', respectively.

The driver IC 30' is an integrated circuit, similar to the driver IC 30 of the optical module 1, for driving the LD device 20'. In the optical module 4, the driver IC 30' is built into the Si platform 10D, as shown in FIG. 16A.

The sub-substrate 50D is one example of a mounting component and includes, as shown in FIG. 15B, a groove portion 51', a recessed portion 52', and a metallic film 53' similar to those formed on the sub-substrate 50 of the optical module 1. The thickness of the sub-substrate 50D is chosen so that the position of the LD device 20' accommodated in the recessed portion 52' can be detected using an infrared transmission image. The groove portion 51' is a groove for fixedly holding the optical fiber 40, and since the LD device 20' is mounted junction-down, the groove portion 51' is formed to a greater depth than the groove portion 51 of the sub-substrate 50 so that the optical fiber 40 is completely embedded within the sub-substrate 50D. The recessed portion 52' is a recess for accommodating the LD device 20'. The metallic film 53' is a bonding portion for surface activated bonding to the Si platform 10D, and is formed in a substantially U-shaped configuration in a position corresponding to the bonding portion 15' of the Si platform 10D so as to surround the groove portion 51' and the recessed portion 52'. In this way, the bonding portion for surface activated bonding need not necessarily be formed over the entire surface of the sub-substrate.

Usually, the LD device is mounted junction-down with its active layer as the light emitting part facing the mounting surface (face down) in order to improve heat dissipation. Junction-down mounting has the further advantage that, since the light emitting part of the LD device is very close to the mounting surface of the mounting substrate that provides the reference surface, it is easy to align the LD device with respect to the reference surface. However, since the active layer of the LD device mounted junction-down is located at substantially the same height as the mounting surface, if the optical fiber is to be centered and aligned with the LD device, there arises a need to form an optical fiber escape groove in the mounting substrate in order to prevent the optical fiber from contacting the mounting surface. For example, in the optical module 1, the groove portion 51 for fixedly holding the optical fiber 40 is formed in the sub-substrate 50, and in addition to that, the groove portion 17 as the escape groove for the optical fiber 40 is formed in the Si platform 10, as illustrated in FIG. 16B. Since the groove portions need to be formed by machining both the mounting substrate of the LD device and the mounting component to be bonded to it, not only does the number of fabrication steps increase correspondingly, but the presence of the two groove portions may reduce the hermeticity of the LD device.

On the other hand, when using the optical module for such purposes as retina scanning, for example, since the LD light source need only have a power as low as several hundred nW to several mW, junction-down mounting accounting for heat dissipation is not needed. This makes it possible to mount the LD device junction-up on the mounting substrate with its light emitting part facing the side opposite to the mounting surface. In view of this, in the optical module 4, the LD device 20' is mounted junction-up on the Si platform 10D.

For example, the thickness of the LD device 20' is about 100 μm, while on the other hand, the optical fiber is about 80 to 125 μm in diameter and about 40 to 62.5 μm in radius. As a result, in the optical module 4, the position of the active layer 22 is higher than the upper surface of the Si platform 10D by the thickness of the LD device 20', as shown in FIG. 16A, and correspondingly, the optical fiber 40 is located at the same height and is thus embedded within the sub-substrate 50D. Accordingly, in the optical module 4, there is no need to form an escape groove for the optical fiber 40 in the Si platform 10D, because the lowest part of the optical fiber 40 arranged at the same height as the light emitting part of the LD device 20' does not contact the upper surface of the Si platform 10D.

In this way, in the optical module 4, the Si platform 10D can be constructed using a grooveless flat substrate, and the fabrication process can be simplified because there is no need to machine the Si platform 10D. Further, in the optical module 4, the function is divided between the two substrates such that the Si platform 10D incorporates the built-in driver IC 30' (integrated circuit) and the sub-substrate 50D allows the height of the optical fiber 40 to be adjusted. In the optical module 1, the effective area for embedding the integrated circuit is limited because of the presence of the groove portion 17 formed in the Si platform 10, but in the optical module 4, integrated circuits and their interconnect lines can be formed at high density within the flat Si platform 10D. The optical module 4 offers the added advantage of increasing the hermeticity of the LD device 20' because of the absence of any groove portion in the Si platform 10D.

Since the side of the LD device opposite to its active layer is polished by machining at the time of manufacture, the overall thickness contains an error, and this error can have a substantial effect in the case of junction-up mounting. Therefore, in the fabrication of the optical module 4, the thickness of the LD device 20' to be used is measured, and the sub-substrate 50D is fabricated that includes the groove portion 51' having a depth that allows the position of the optical fiber 40 to be aligned with the light emitting part of the LD device 20', and the thus fabricated sub-substrate is used. It thus becomes possible to mount the LD device junction-up while eliminating the effect of the thickness error.

Figure 17:
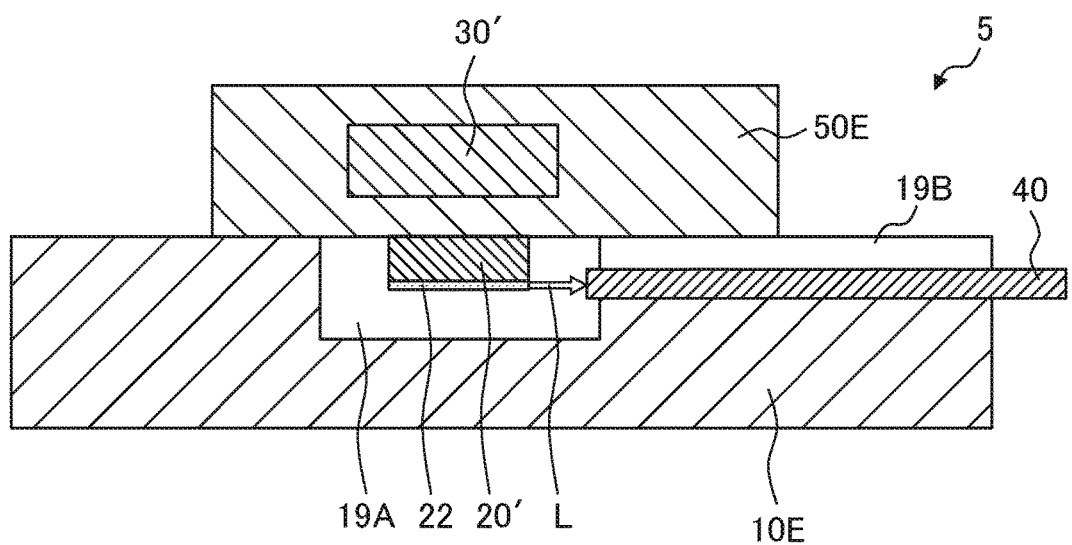
FIG. 17 is a cross-sectional view schematically illustrating the structure of an optical module 5.

FIG. 17 is a cross-sectional view schematically illustrating the structure of an optical module 5. The optical module 5 includes, as major component elements, a Si platform 10E, an LD device 20', a driver IC 30', an optical fiber 40, and a sub-substrate 50E. The optical module 5 differs from the other optical modules 1 to 4 in that the LD device 20' is mounted on the flat sub-substrate 50E and in that the driver IC 30' is built into the sub-substrate 50E.

The Si platform 10E is one example of a mounting component, and includes a recessed portion 19A for accommodating the LD device 20' and a groove portion 19B for accommodating the optical fiber 40. The groove portion 19B is formed to a depth sufficient to completely embed the optical fiber 40 within the Si platform 10E. The thickness of the Si platform 10E is chosen so that the position of the LD device 20' accommodated in the recessed portion 19A can be detected using an infrared transmission image.

The LD device 20' is a laser diode similar to the one used in the optical module 4, and is mounted junction-up on the sub-substrate 50E with its active layer 22 facing the side opposite to the sub-substrate 50E. An arrow L in FIG. 17 indicates the laser light emitted from the LD device 20'.

The sub-substrate 50E is one example of a mounting substrate, and differs from the so far described sub-substrates in that the sub-substrate 50E is a flat substrate that does not include recessed portions, etc. In the optical module 5, the driver IC 30' as an integrated circuit for driving the LD device 20' is built into the sub-substrate 50E, as shown in FIG. 17. The Si platform 10E and the sub-substrate 50E include a bonding portion (bumps) and a metallic film (not shown) for surface activated bonding.

In the optical module 5, the recessed portion 19A for accommodating the LD device 20' is formed in the Si platform 10E, while the sub-substrate 50E is constructed from a flat substrate, so that integrated circuits and their interconnect lines can be formed at high density on the sub-substrate 50E. As a result, in the optical module 5, it is easy to build the driver IC 30' into the sub-substrate 50E, and it becomes possible to determine whether the LD device 20' is defective or non-defective on the sub-substrate alone. For example, by forming integrated circuits on a wafer and mounting a large number of LD devices, it becomes possible to perform aging (conduction test) on all the devices collectively and to sort out defectives and non-defectives. Then, the wafer is cut into separate pieces, and a non-defective one is used as the sub-substrate 50E; in this way, the optical module can be fabricated by selecting only non-defectives, and the man-hour can be reduced drastically. Further, since the recessed portion and groove portion are formed only in the Si platform 10E, machining need be performed on only one substrate, which also serves to simplify the fabrication process.

While it has been described that the p-electrode and n-electrode of the LD device 20 are disposed on the mounting side facing the Si platform 10 and on the opposite side, respectively, a device with its p-electrode and n-electrode both disposed on the mounting side may be used as the LD device 20, 20'. In that case, since there is no need to use a wire bond (the wire bond 61 in FIG. 2B) to connect the LD device 20, 20', the depth of the recessed portion for accommodating the LD device 20, 20' can be correspondingly reduced. As a result, the thickness of the sub-substrate, and hence the thickness of the entire optical module, can be further reduced.

An optical module incorporating a structure for hermetically sealing a mounted laser device will be described below.

For example, an LD module of a can-type package that uses a stem substrate can be hermetically sealed using metal welding such as seam welding. However, in the case of a flat-type integrated module in which a laser device, optical fiber, driver IC, etc., are integrally mounted on a substrate, it is difficult to employ a hermetic seal structure such as a can-type package. Furthermore, in the case of an optical module in which a laser device to be optically coupled to an optical fiber is mounted between two substrates, the alignment between the optical fiber and the laser device and the bonding of the two substrates must be performed simultaneously, and it is difficult to perform bonding that requires heating simultaneously with the alignment.

In view of the above, an optical module that allows the laser device to be hermetically sealed after the mounting substrate of the laser device has been bonded to the substrate for protecting the laser device with the laser device and the optical fiber aligned with respect to each other will be described below along with a fabrication method for the same.

Figure 18A:
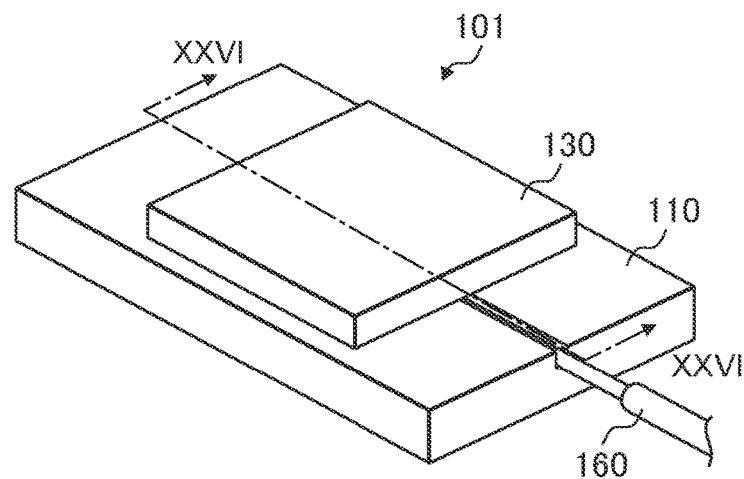
FIG. 18A is a perspective view schematically illustrating the structure of an optical module 101.
Figure 18B:
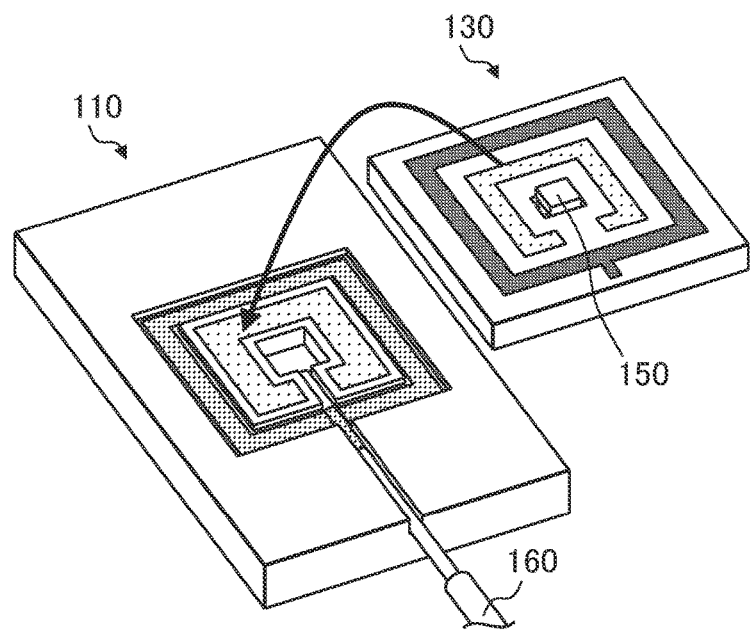
FIG. 18B is an exploded perspective view of the optical module 101.

FIG. 18A is a perspective view schematically illustrating the structure of an optical module 101, and FIG. 18B is an exploded perspective view of the optical module 101. The optical module 101 includes a Si platform 110, a sub-substrate 130, an LD device 150, and an optical fiber 160. The optical module 101 is a flat-type integrated module in which the LD device 150 and the optical fiber 160 are mounted integrally between the Si platform 110 and the sub-substrate 130. As shown in FIG. 18B, the LD device 150 is mounted on the sub-substrate 130, and is protected with the sub-substrate 130 mounted on the Si platform 110. As will be described later, the Si platform 110 and the sub-substrate 130 include an alignment bonding portion for bonding together the two substrates with the LD device 150 and the optical fiber 160 aligned with respect to each other, and a hermetic sealing bonding portion provided outside the alignment bonding portion so as to conform to the inner periphery of the sub-substrate 130. In the optical module 101, the LD device 150 is hermetically sealed with this hermetic sealing bonding portion.

The optical module 101 further includes a driver IC (the driver IC 180 to be shown later in FIG. 30A) for driving the LD device 150. This driver IC is built into the sub-substrate 130, but instead, may be mounted, for example, on the Si platform 110 or on the sub-substrate 130.

Figure 19A:
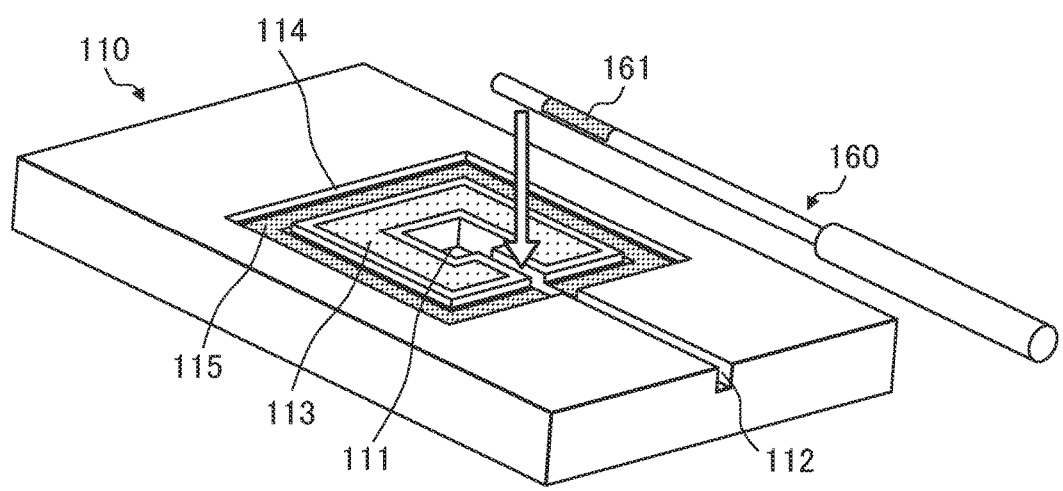
FIG. 19A is a perspective view of the Si platform 110.
Figure 19B:
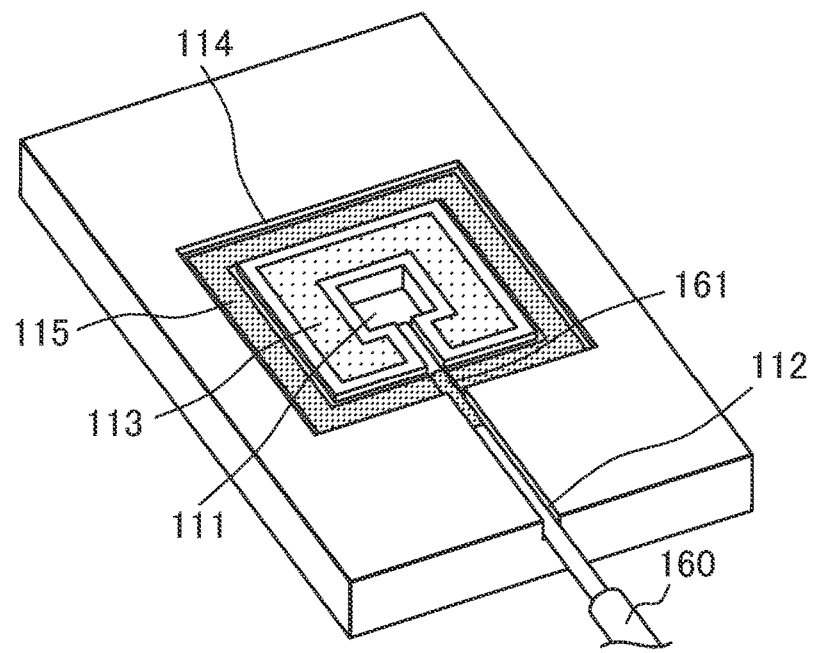
FIG. 19B is a perspective view of the Si platform 110.

FIGS. 19A and 19B are perspective views of the Si platform 110. The Si platform 110 is one example of a mounting component and a first substrate, and is a silicon substrate having an upper surface measuring, for example, 3 mm×5 mm and a thickness of about 0.3 to 0.5 mm. Though not shown here, the Si platform 110 is mounted on a circuit substrate for supplying electrical signals to the LD device 150. The alignment bonding portion and hermetic sealing bonding portion of the optical module 101 also serve to provide electrical connections; for example, using the alignment bonding portion as a power supply line and the hermetic sealing bonding portion as a GND line, electrical signals are supplied from the circuit substrate via the Si platform 110 to the LD device 150 mounted on the sub-substrate 130.

As shown in FIG. 19A, a recessed portion 111, a groove portion 112, a bonding portion 113, a hermetic sealing groove portion 114, and a hermetic sealing metallic pattern 115 are provided on the upper surface of the Si platform 110.

The recessed portion 111 is a recess for accommodating the LD device 150 when the Si platform 110 and the sub-substrate 130 are bonded together, and has a bottom surface measuring, for example, 0.5 mm×0.5 mm and a depth of 0.2 mm. In FIG. 19A, etc., the recessed portion 111 is shown as being rectangular in shape, but the shape may be, for example, cylindrical, and may not be limited to any specific shape, the only requirement being that the recessed portion 111 be formed in a shape that can accommodate the LD device 150. The thickness of the Si platform 110 is chosen so that the position of the LD device 150 accommodated in the recessed portion 111 can be detected using an infrared transmission image.

The groove portion 112 is a groove for fixedly holding the optical fiber 160 so that the core of the optical fiber 160 is positioned at a predetermined depth with respect to the bonding surface to be bonded to the sub-substrate 130, and is formed continuous with the recessed portion 111. The diameter of the optical fiber 160 is, for example, 0.125 mm, and the groove portion 112 has a width and depth just sufficient to accommodate the optical fiber 160, allowing for a tolerance of several microns, for example.

The bonding portion 113 corresponds to the alignment bonding portion for bonding together the Si platform 110 and the sub-substrate 130 by surface activation with the LD device 150 and the optical fiber 160 aligned with respect to each other. The bonding portion 113 is formed in a substantially U-shaped configuration on the upper surface of the Si platform 110 so as to surround the recessed portion 111 except the portion where the groove portion 112 is formed. The bonding portion 113 is provided with a large number of micro-bumps (bumps), each being a tiny protrusion with a diameter of several microns formed, for example, from a metallic material such as gold (Au). The area and shape of the bonding portion 113 may be made different from those shown in FIG. 19A, etc.

The hermetic sealing groove portion 114 is a groove etched by D-RIE in the shape of a rectangular frame, and is provided outside the bonding portion 113 so as to conform to the inner periphery of the region to be covered with the sub-substrate 130. The hermetic sealing groove portion 114 is formed in a position that surrounds the LD device 150 when the Si platform 110 and the sub-substrate 130 are bonded together. The depth of the hermetic sealing groove portion 114 is smaller than that of the groove portion 112, and is, for example, about 50 to 100 μm.

The hermetic sealing metallic pattern 115 is a plated interconnection pattern formed, for example, by applying gold plating after applying copper or nickel plating as primary plating, and is formed on the bottom surface of the hermetic sealing groove portion 114 along the bonding surface to be bonded to the sub-substrate 130. The hermetic sealing metallic pattern 115 corresponds to the hermetic sealing bonding portion provided outside the bonding portion 113 (the alignment bonding portion). The hermetic sealing metallic pattern 115 is provided in a position one step lower than the bonding surface to be bonded to the sub-substrate 130 so that it does not contact the sub-substrate 130 when the LD device 150 and the optical fiber 160 are aligned with respect to each other and the Si platform 110 and the sub-substrate 130 are bonded together by surface activation.

The optical fiber 160 is a single-mode fiber (SMF) through which the laser light emitted from the LD device 150 is guided. One end of the optical fiber 160 is covered with the Si platform 110 and sub-substrate 130 and is optically coupled to the LD device 150, and the other end is brought out to the outside of the two substrates. The optical fiber 160 is first placed inside the groove portion 112 before the sub-substrate 130 is placed on the Si platform 110, and then fixed in place by soldering. A GI (Graded Index) lens as a coupling member may be provided integrally at the end of the optical fiber 160 that faces the LD device 150.

FIG. 19B shows the condition in which the optical fiber 160 is fixed to the Si platform 110. Pretreatment such as an ITO deposited film or electroless plating, for example, is applied to the portion of the optical fiber 160 that overlaps the hermetic sealing groove portion 114 when the optical fiber 160 is placed inside the groove portion 112, and a fiber metal 161 formed by the same gold plating as that used to form the hermetic sealing metallic pattern 115 is provided to cover the pretreated portion. The fiber metal 161 is one example of a hermetic sealing metallic pattern of an optical fiber, and forms the hermetic sealing bonding portion together with the hermetic sealing metallic pattern 115 of the Si platform 110. The fiber metal 161 is formed, for example, on only the upper half of the optical fiber 160, as shown in FIG. 19A, in order to highly precisely fix the optical fiber 160 with respect to the Si platform 110.

The optical fiber 160 is fixed in place in the groove portion 112 by soldering, for example, at the place covered with the fiber metal 161. At this time, the gap created between the hermetic sealing metallic pattern 115 and the optical fiber 160 due to the presence of the groove portion 112 and the gap between the optical fiber 160 and the side and bottom surfaces of the groove portion 112 are filled with solder in order to ensure hermetic sealing. This solder functions as a hermetic sealing member for hermetically sealing the laser device. In this way, the hermetic sealing metallic pattern 115 and the fiber metal 161 together form, on the Si platform 110, a sealing pattern of a rectangular frame shape that functions as a hermetic sealing bonding portion.

Figure 20A:
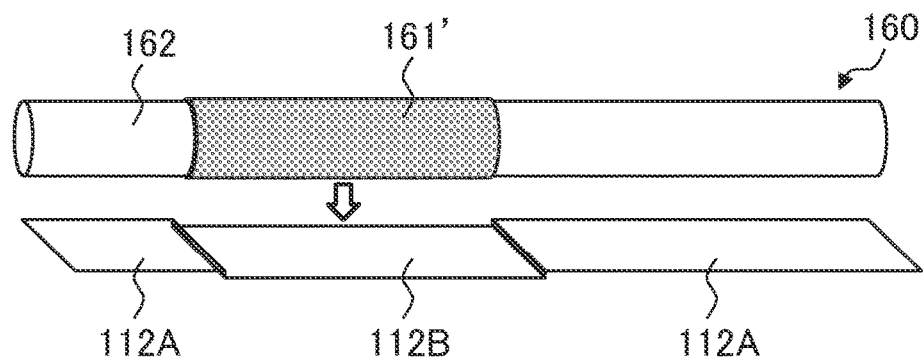
FIG. 20A is a diagram illustrating an example of an alternative method for fixing the optical fiber 160.
Figure 20B:
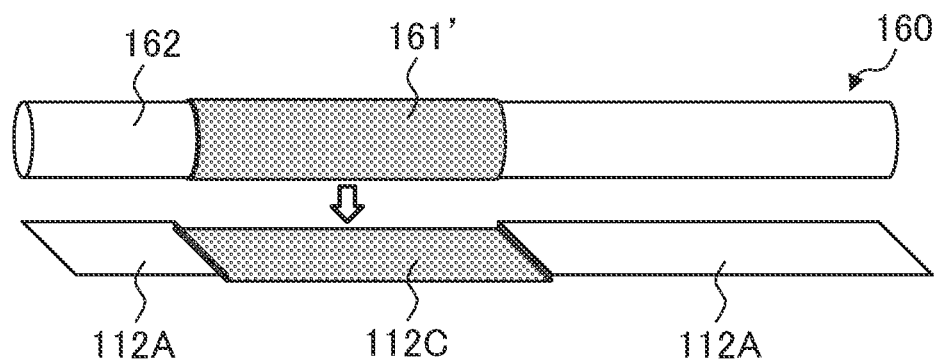
FIG. 20B is a diagram illustrating an example of an alternative method for fixing the optical fiber 160.

FIGS. 20A and 20B are diagrams each illustrating an example of an alternative method for fixing the optical fiber 160. In these diagrams, only the optical fiber 160 and the bottom surface 112A of the groove portion 112 of the Si platform 110 are shown. Reference numeral 162 indicates the end of the optical fiber 160 that faces the LD device 150.

As shown at reference numeral 161' in FIG. 20A, the fiber metal may be formed around the entire circumference of the optical fiber 160, rather than forming it on only the upper half of the optical fiber 160. In this case, the bottom surface 112A of the groove portion 112 is provided with a one-step lower portion 112B in the position corresponding to the fiber metal 161' in order to prevent the height position of the optical fiber 160 in the groove portion 112 from changing due to the thickness of the fiber metal 161'. The optical fiber 160 is placed inside the groove portion 112 by aligning the position of the fiber metal 161' with the portion 112B, and is fixed in place by soldering in the same manner as in FIG. 19A.

Alternatively, the optical fiber 160 may be fixed in the groove portion 112 by surface activated bonding. In this case, as shown in FIG. 20B, a gold pattern 112C is formed on the one-step lower portion of the bottom surface 112A of the groove portion 112, and the fiber metal 161' (gold plating) is brought into contact with the gold pattern 112C to accomplish the surface activated bonding. In this case also, in order to ensure hermetic sealing, the gaps created around the fixed fiber metal 161' are filled with solder in the same manner as in FIG. 19A.

Figure 21A:
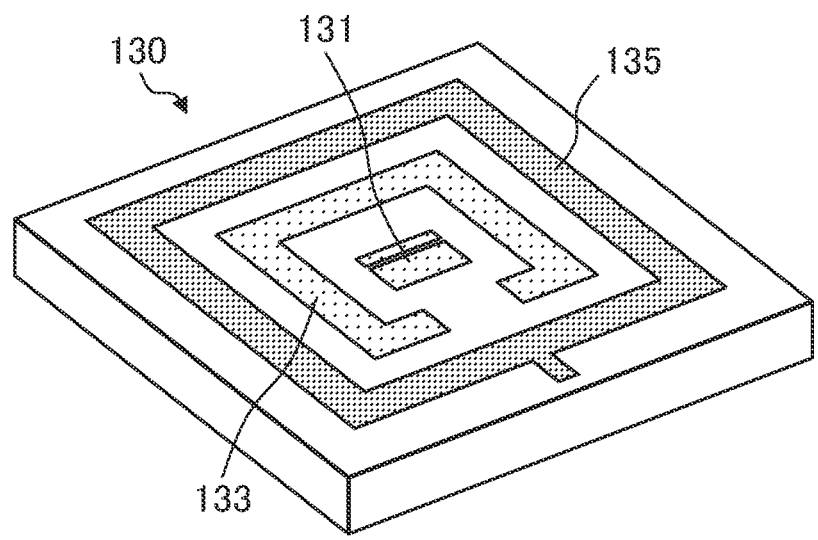
FIG. 21A is a perspective view of the sub-substrate 130.
Figure 21B:
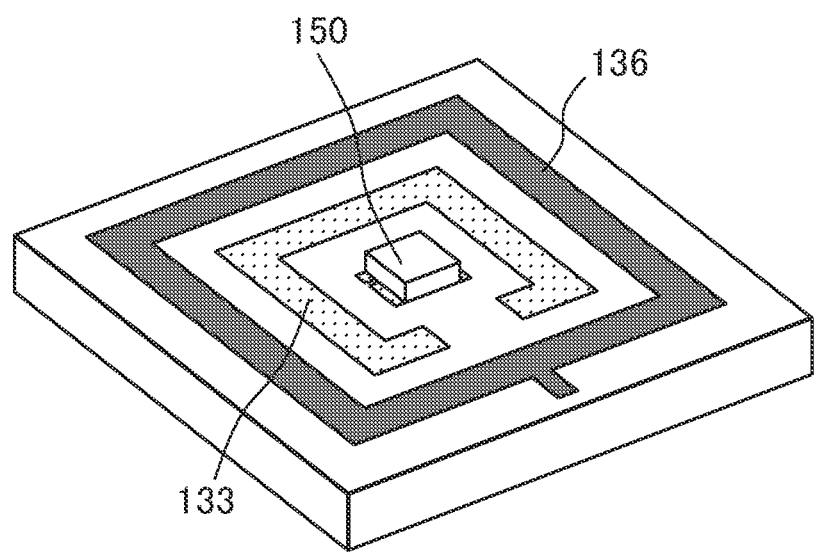
FIG. 21B is a perspective view of the sub-substrate 130.

FIGS. 21A and 21B are perspective views of the sub-substrate 130. The sub-substrate 130 is one example of a mounting substrate and a second substrate, and is a flat silicon substrate having an upper surface measuring, for example, 2.5 mm×2.5 mm and a thickness of about 0.1 to 0.3 mm. The LD device 150 is mounted on the sub-substrate 130, and when the sub-substrate 130 is mounted on the Si platform 110, the LD device 150 is optically coupled to the optical fiber 160. Since the sub-substrate 130 is mounted upside down on the Si platform 110, the upper surface shown in FIGS. 21A and 21B is the bonding surface to be bonded to the Si platform 110. The sub-substrate 130 also functions as a cover for packaging the LD device 150 between it and the Si platform 110. The thickness of the sub-substrate 130 must be made large enough to be able to protect the LD device 150 when the sub-substrate 130 is placed upside down on the Si platform 110 so as to accommodate the mounted LD device 150 in the recessed portion 111, but must not be made too large so that the position of the LD device 150 can be detected using the infrared transmission image during alignment.

As shown in FIGS. 21A and 21B, a mounting portion 131, a metallic film 133, a hermetic sealing metallic pattern 135, and a presolder 136 are provided on the upper surface of the sub-substrate 130. The driver IC (the driver IC 180 to be shown later in FIG. 30A) for driving the LD device 150 is built into the sub-substrate 130.

The mounting portion 131, which is provided in the center of the sub-substrate 130, is a region for mounting the LD device 150. Similarly to the bonding portion 113 of the Si platform 110, the mounting portion 131 is provided with a large number of micro-bumps for surface activated bonding of the LD device 150.

The LD device (laser device) 150 is a laser diode that measures, for example, 0.3 mm×0.3 mm×0.1 mm, and that emits red, green, or blue laser light. Alternatively, when using the optical module 101, for example, for eye tracking or depth sensing, a laser diode that emits near-infrared laser light at 780 nm to 1300 nm, for example, is used as the LD device 150. The LD device 150 is mounted on the mounting portion 131 of the sub-substrate 130 by surface activated bonding. The LD device 150 is mounted junction-up with its active layer facing the side opposite to the mounting surface. As a result, when the sub-substrate 130 is mounted on the Si platform 110, the active layer of the LD device 150 is located on the side nearer to the Si platform 110. The p-electrode and n-electrode of the LD device 150 may both be disposed on the mounting side, or may be disposed on the mounting side facing the sub-substrate 130 and on the opposite side, respectively. In the latter case, the electrode on the side opposite from the sub-substrate 130 is connected to the sub-substrate 130 by a wire bond (not shown).

The metallic film 133 is a film formed, for example, from gold (Au), and corresponds to the alignment bonding portion for bonding together the Si platform 110 and the sub-substrate 130 by surface activation in cooperation with the bonding portion 113 of the Si platform 110. The metallic film 133 is formed in a substantially U-shaped configuration so as to surround the mounting portion 131 and so as to face the bonding portion 113 of the Si platform 110 when the sub-substrate 130 is mounted on the Si platform 110.

The hermetic sealing metallic pattern 135 is a plated interconnection pattern formed, for example, by gold plating, similar to the hermetic sealing metallic pattern 115 formed on the Si platform 110, and corresponds to the hermetic sealing bonding portion provided outside the metallic film 133 (the alignment bonding portion). The hermetic sealing metallic pattern 135 is formed on the bonding surface to be bonded to the Si platform 110 in a substantially rectangular frame shape so as to surround the metallic film 133 (that is, the LD device 150) and so as to face the hermetic sealing metallic pattern 115 on the Si platform 110 when the Si platform 110 and the sub-substrate 130 are bonded together so as to cover the LD device 150. In the example shown in FIG. 21A, the upper surface of the sub-substrate 130 is a flat surface, but the hermetic sealing metallic pattern 135 may be formed at a different height than the metallic film 133, provided that the hermetic sealing metallic pattern 135 does not contact the Si platform 110 when the Si platform 110 and the sub-substrate 130 are bonded together by surface activation.

The presolder 136 is a solder preprinted on the hermetic sealing metallic pattern 135, as shown in FIG. 21B, and together with the hermetic sealing metallic pattern 135, forms the hermetic sealing bonding portion. The presolder 136 need not necessarily be formed uniformly, and its shape and amount can be appropriately adjusted within a range that can achieve the function of hermetic sealing.

Figure 22:
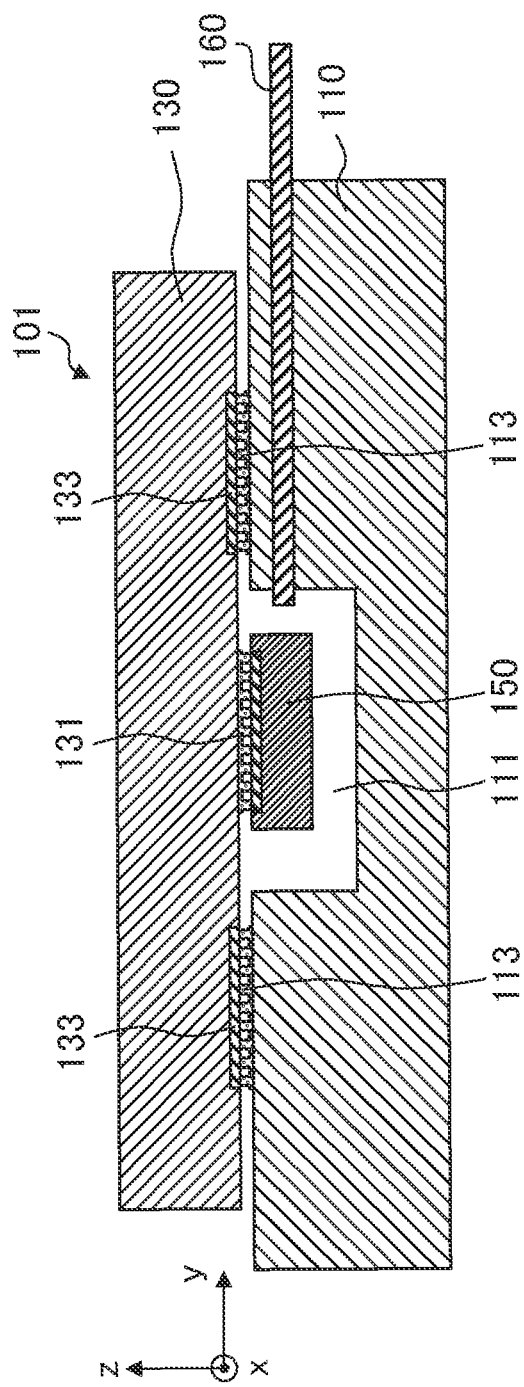
FIG. 22 is a longitudinal cross-sectional view showing a portion of the optical module 101.

FIG. 22 is a longitudinal cross-sectional view showing a portion of the optical module 101. Since FIG. 22 is a diagram for explaining the bonding portion 113 of the Si platform 110 and the metallic film 133 formed on the sub-substrate 130, the hermetic sealing metallic patterns 115 and 135 and other portions not necessary for explaining the bonding portion 113 and the metallic film 133 are omitted from illustration in FIG. 22.

As shown in FIG. 22, the Si platform 110 and the sub-substrate 130 are bonded together via the bonding portion 113 (bumps) of the Si platform 110 and the metallic film 133 formed on the sub-substrate 130. The structure of the bonding portion 113 is the same as the structure of the bonding portion 15 of the Si platform 10 in the optical module 1 shown in FIG. 4B. The surfaces of the bumps of the bonding portion 113 and the surface of the metallic film 133 are activated by cleaning them with Ar plasma prior to bonding. Then, when bonding, the sub-substrate 130 is placed on the Si platform 110 by aligning the position of the bonding portion 113 to the metallic film 133, and a load is applied at normal temperature. In this way, the metallic film 133 is brought into contact with the upper surfaces of the bumps of the bonding portion 113, and the bumps are crushed, causing the interdiffusion of metal atoms to occur between the bumps and the metallic film. By thus utilizing the adhesion forces acting between the atoms, the Si platform 110 and the sub-substrate 130 are bonded together by surface activation.

In the optical module 101, by controlling the magnitude of the load applied when bonding the sub-substrate 130, the LD device 150 and the optical fiber 160 can be aligned more strictly in the vertical direction.

Further, as shown in FIG. 22, the bonding between the sub-substrate 130 and the LD device 150 is likewise achieved by surface activated bonding between the bumps of the bonding portion 113 and the metallic film formed on the LD device 150.

Figure 23:
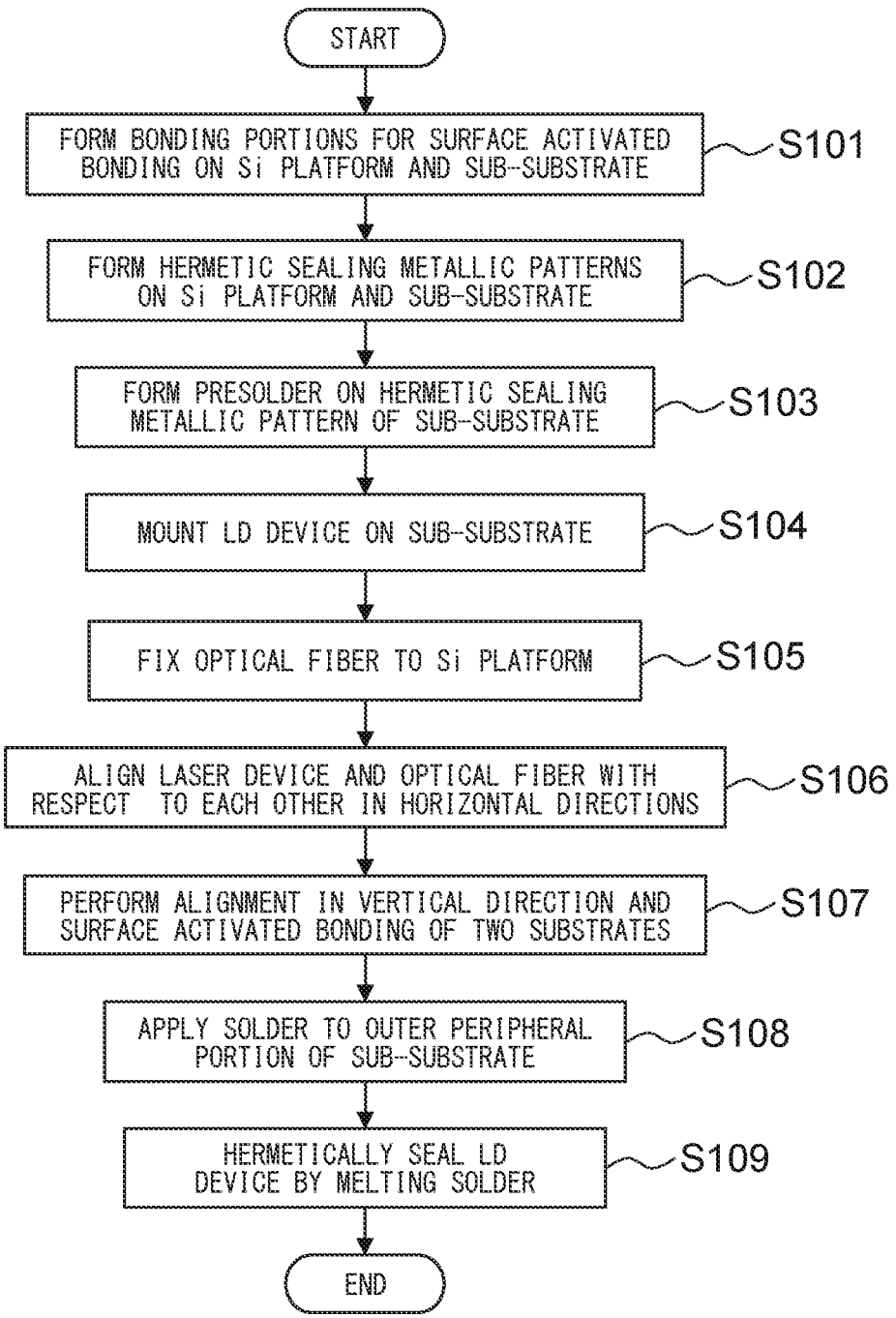
FIG. 23 is a flowchart illustrating an example of a fabrication process of the optical module 101.

FIG. 23 is a flowchart illustrating an example of a fabrication process of the optical module 101.

First, the recessed portion 111, the groove portion 112, and the hermetic sealing groove portion 114 are formed in the substrate of the Si platform 110 by using etching and D-RIE techniques. Then, the bonding portion 113 and metallic film 133 (alignment bonding portions) for surface activated bonding are formed on the Si platform 110 and the sub-substrate 130 incorporating the built-in driver IC, respectively (S101). The hermetic sealing metallic patterns 115 and 135 which oppose each other and surround the laser device when the Si platform 110 and the sub-substrate 130 are bonded together are formed on the respective substrates (S102). Further, the presolder 136 is formed on the hermetic sealing metallic pattern 135 of the sub-substrate 130 (S103). Alternatively, the presolder 136 may be formed on the hermetic sealing metallic pattern 115 of the Si platform 110, not on the hermetic sealing metallic pattern 135 of the sub-substrate 130, or may be formed on both of the hermetic sealing metallic patterns 115 and 135.

Next, the LD device 150 is mounted on the mounting portion 131 of the sub-substrate 130 by surface activated bonding (S104). Further, the optical fiber 160 is fixed to the groove portion 112 of the Si platform 110 by soldering (S105). After that, the sub-substrate 130 is mounted upside down on the Si platform 110 so as to cover the recessed portion 111 and accommodate the LD device 150 in the recessed portion 111.

Then, the LD device 150 and the optical fiber 160 are aligned with respect to each other in the horizontal directions (x and y directions) (S106). The horizontal alignment is accomplished in two steps, first by passive alignment and then by active alignment. The passive alignment is performed using, for example, the alignment equipment 200 shown in FIG. 9.

With the passive alignment similar to that described with reference to FIGS. 9 to 11C, the rough position of the sub-substrate 130 relative to the Si platform 110 in the horizontal directions on the bonding surface is coarsely adjusted with micron-order precision. At this time, the relative position between the LD device 150 mounted on the sub-substrate 130 and the optical fiber 160 fixedly held on the Si platform 110 is adjusted with a precision of several microns.

Next, using the alignment-mounting equipment 300 shown in FIG. 12, the LD device 150 and the optical fiber 160 are actively aligned in the horizontal directions. The active alignment is the same as that described with reference to FIG. 12.

Next, the alignment in the vertical direction (z direction) and the surface activated bonding between the Si platform 110 and the sub-substrate 130 are performed (S107). The vertical alignment is performed simultaneously with the surface activated bonding of the two substrates in the same manner as that described with reference to FIG. 12.

Figure 24:
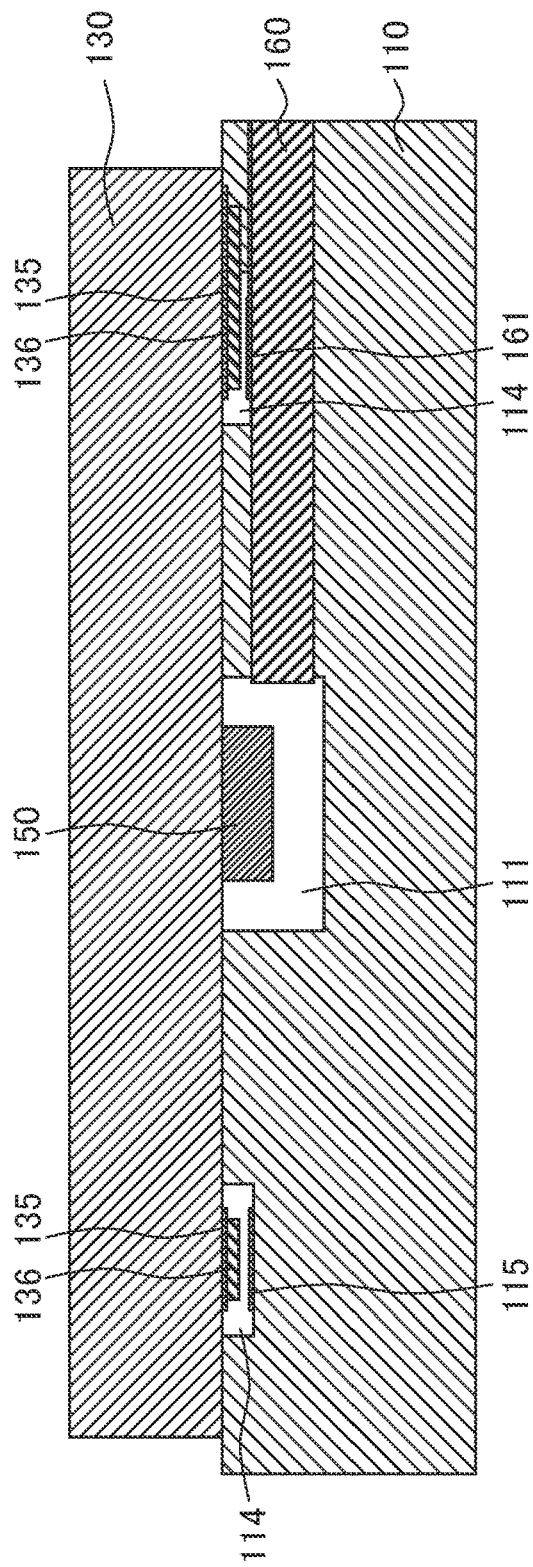
FIG. 24 is a cross-sectional view of the optical module 101, showing the condition in which the Si platform 110 and the sub-substrate 130 are bonded together by surface activation.

FIG. 24 is a cross-sectional view of the optical module 101, showing the condition in which the Si platform 110 and the sub-substrate 130 are bonded together by surface activation. The cross-sectional views shown in FIG. 24 and subsequent figures are given to explain primarily the hermetic sealing bonding portions, and therefore, the alignment bonding portions, i.e., the bonding portion 113 and the metallic film 133, are omitted from illustration.

When the surface activated bonding is done, the Si platform 110 and the sub-substrate 130 are bonded only via the alignment bonding portions, i.e., the bonding portion 113 and the metallic film 133, and some gap is left between the hermetic sealing bonding portions, i.e., the hermetic sealing metallic pattern 115 and the presolder 136, as shown in FIG. 24. If the hermetic sealing metallic pattern 115 and the presolder 136 are in contact with each other during the surface activated bonding, the contact portion will interfere, and the position of the sub-substrate 130 cannot be adjusted so as to precisely align the LD device 150 and the optical fiber 160. However, in the optical module 101, since the hermetic sealing metallic pattern 115 of the Si platform 110 is formed on the bottom surface of the hermetic sealing groove portion 114 which is one step lower than the mounting surface, the surface activated bonding can be accomplished without being affected by the hermetic sealing bonding portions.

After the surface activated bonding, solder is applied to an outer peripheral portion of the sub-substrate 130 bonded to the Si platform 110 (S108). Here, it is recommended to apply a solder paste, for example, to a portion near the boundary between the sub-substrate 130 and the groove portion 112 of the Si platform 110 in which the optical fiber 160 is fixed, more specifically, near the upper part of the fiber metal 161 (see FIG. 19B).

FIGS. 25A and 25B are diagrams for explaining the step of applying solder 170 to an outer peripheral portion of the sub-substrate 130. As shown in enlarged form in FIG. 25A, the solder 170 (solder paste) is applied into the groove portion 112 near the boundary to the sub-substrate 130. FIG. 25B is a cross-sectional view showing the condition in which the solder 170 has been applied to a portion near the upper part of the fiber metal 161.

Next, the LD device 150 is hermetically sealed by melting the applied solder 170 (S109). More specifically, the entire structure of the optical module is subjected to reflow heating, for example, at 200 to 300° C., thereby melting the solder 170. Then, as indicated by an arrow in FIG. 25B, the melted solder 170 flows into a narrow gap formed between the presolder 136 and the hermetic sealing metallic pattern 115 inside the hermetic sealing groove portion 114 covered by the sub-substrate 130, penetrates deeper by capillary action, and is thus joined to the presolder 136. In this way, the gap formed between the hermetic sealing metallic pattern 115 on the Si platform 110 and the presolder 136 on the sub-substrate 130 is filled with the solder along the entire periphery of the rectangular-shaped hermetic sealing bonding portion surrounding the LD device 150. That is, the solder 170 functions as a hermetic sealing member for hermetically sealing the laser device by filling the gap left between the hermetic sealing metallic patterns formed on the first and second substrates bonded together by surface activation. By thus hermetically sealing the outer periphery of the LD device 150 with the solder 170 after the alignment is done, a package with the LD device 150 hermetically sealed is constructed. This completes the fabrication of the optical module 101.

Figure 26:
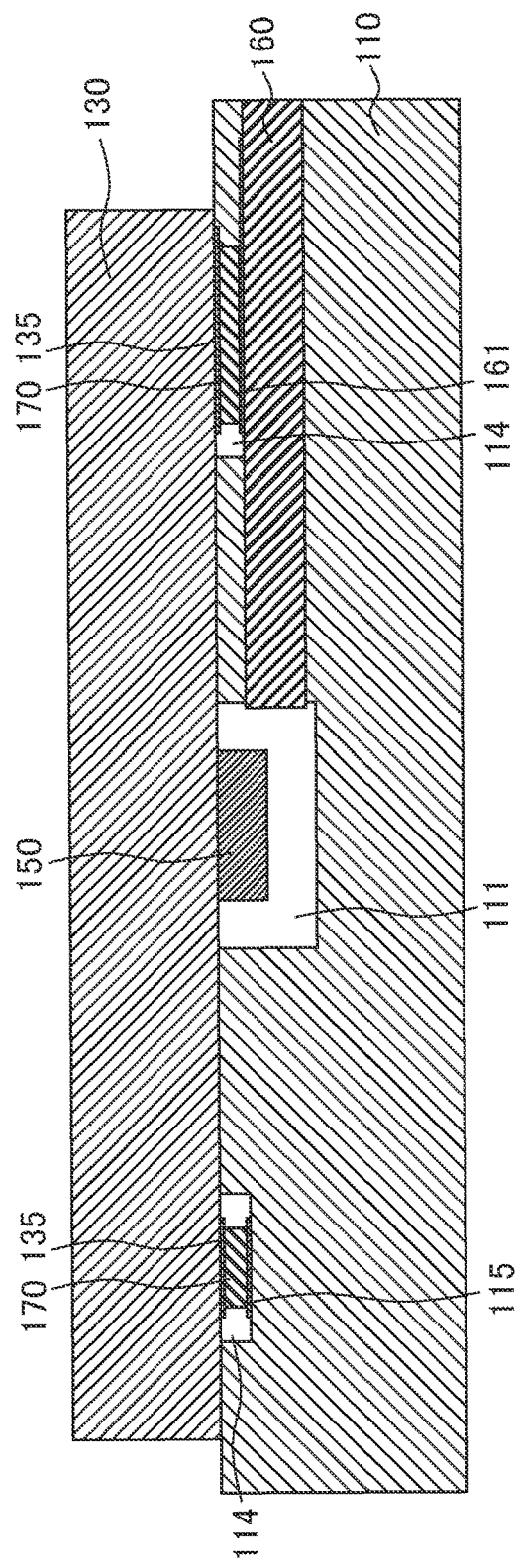
FIG. 26 is a cross-sectional view of the optical module 101 with the LD device 150 hermetically sealed.

FIG. 26 is a cross-sectional view of the optical module 101 with the LD device 150 hermetically sealed. FIG. 26 shows the completed optical module 101, and corresponds to a cross-sectional view taken along line XXVI-XXVI in FIG. 18A. By reflow heating, the solder 170 melts and spreads throughout the hermetic sealing groove portion 114 and is joined to the presolder 136, thus filling the gap between the hermetic sealing metallic patterns 115 and 135, as shown in FIG. 26. At this time, since the solder 170 spreads by passing between the hermetic sealing metallic patterns 115 and 135 located inside the hermetic sealing groove portion 114, the solder 170 does not flow into the alignment bonding portions, i.e., the bonding portion 113 and the metallic film 133, located between the hermetic sealing groove portion 114 and the LD device 150.

As described above, in the optical module 101, the Si platform 110 and the sub-substrate 130, which are bonded together by surface activation, respectively include the bonding portion 113 and metallic film 133 (the micro-bumps and the metallic film each made of a metallic material) as the alignment bonding portions, and the hermetic sealing metallic patterns 115 and 135, presolder 136, and fiber metal 161 as the hermetic sealing bonding portions. The metallic film 133 and hermetic sealing metallic pattern 135 of the sub-substrate 130 are formed on the same surface, but the hermetic sealing metallic pattern 115 of the Si platform 110 is formed on a surface one step lower than the bonding portion 113. As a result, the alignment between the LD device 150 and the optical fiber 160 and the surface activated bonding between the Si platform 110 and the sub-substrate 130 can be performed without causing the hermetic sealing metallic pattern 115 or 135 and the presolder 136 formed as hermetic sealing bonding portions on one substrate to contact the opposite substrate. Then, after the two substrates are bonded together, the solder 170 (solder paste) is applied, and using this as a pump primer, the hermetic sealing metallic patterns 115 and 135 and presolder 136 as the hermetic sealing bonding portions are caused to melt and joined together. In this way, after the LD-fiber alignment and the surface activated bonding are done, the LD device 150 can be hermetically sealed by melting the solder 170 and closing up the gap left between the Si platform 110 and the sub-substrate 130.

If the solder for fixing the optical fiber 160 melts during the reflow heating, the LD-fiber alignment may not be achieved precisely; therefore, a solder having a melting point higher than the temperature of the reflow heating (that is, higher than the melting point of the presolder 136 and solder 170 used for hermetic sealing) must be used as the solder for fixing the optical fiber 160. If it is desired to use, as the solder for fixing the optical fiber 160, a solder having the same melting point as the presolder 136 and solder 170 used for hermetic sealing, the end 162 of the optical fiber 160 (see FIG. 20A), for example, may be fixed to the groove portion 112 by adhesive. However, if the LD device 150 is to be hermetically sealed using an adhesive, there can occur a situation where organic substances contained in the adhesive adhere to the light emitting part of the LD device 150, leading to a degradation of the device reliability. In view of this, it is preferable to hermetically seal the LD device 150 by using only an inorganic material, as in the optical module 101. This contributes to increased reliability of the LD device 150.

Figure 27A:
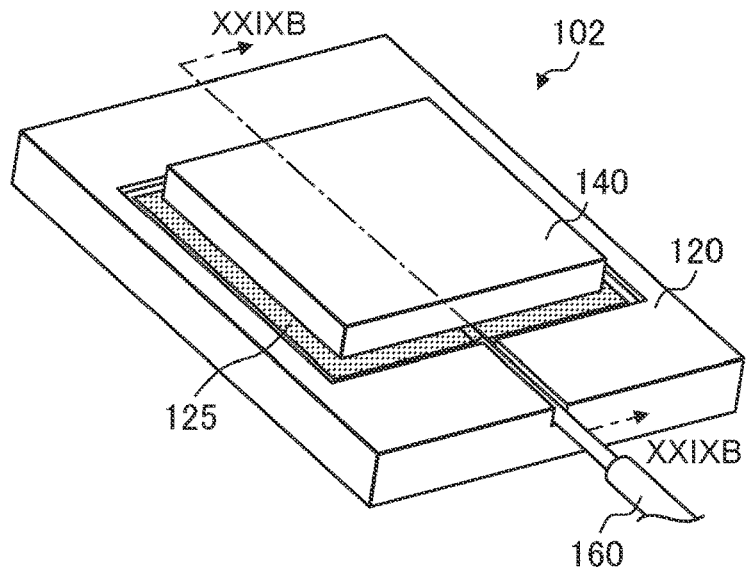
FIG. 27A is a perspective view schematically illustrating the structure of an optical module 102.
Figure 27B:
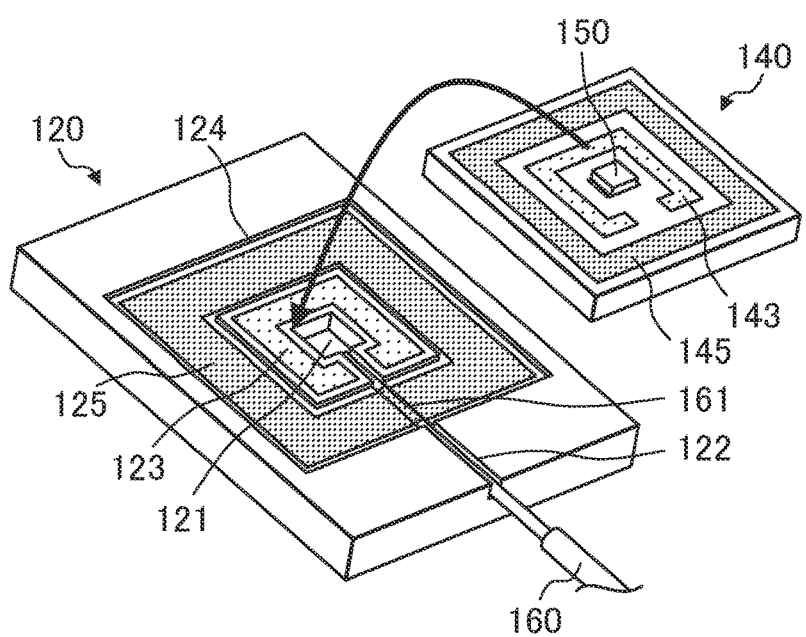
FIG. 27B is an exploded perspective view of the optical module 102.

FIG. 27A is a perspective view schematically illustrating the structure of an optical module 102, and FIG. 27B is an exploded perspective view of the optical module 102. The optical module 102 is a flat-type integrated module similar to the optical module 101, and includes a Si platform 120, a sub-substrate 140, an LD device 150, and an optical fiber 160. In the optical module 102, a recessed portion 121, a groove portion 122, a bonding portion 123, a hermetic sealing groove portion 124, and a hermetic sealing metallic pattern 125 are provided on the upper surface of the Si platform 120, while a metallic film 143 and a hermetic sealing metallic pattern 145 are formed on the upper surface of the sub-substrate 140. As shown in FIG. 27B, the LD device 150 is mounted on the sub-substrate 140, and is protected with the sub-substrate 140 mounted on the Si platform 120. The structure of the optical module 102 is the same as the structure of the optical module 101, except the area of the hermetic sealing metallic pattern 125 formed on the Si platform 120, and except that presolder is not provided on the hermetic sealing metallic pattern 145 formed on the sub-substrate 140. Therefore, the following description of the optical module 102 focuses on the differences from the optical module 101, and the structure identical between the two optical modules will not be further described herein.

Figure 28A:
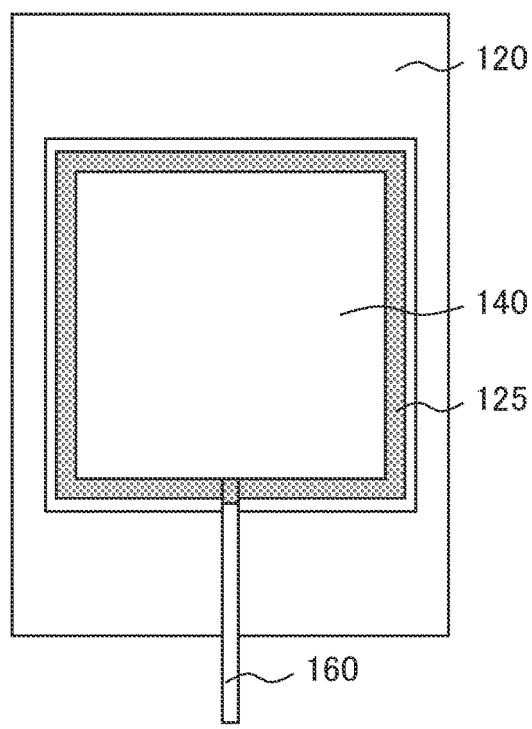
FIG. 28A is a top plan view of the optical module 102, showing the condition in which the Si platform 120 and the sub-substrate 140 are bonded together.
Figure 28B:
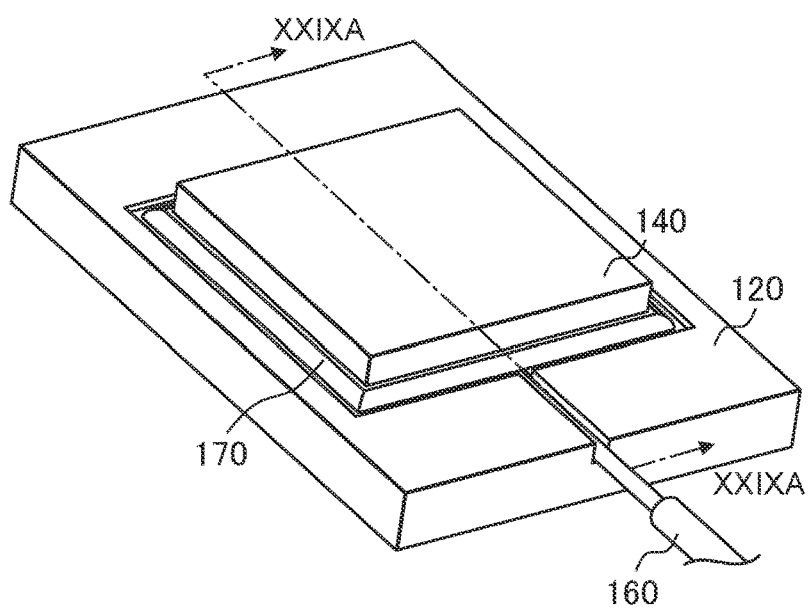
FIG. 28B is a perspective view of the optical module 102, showing the condition in which the Si platform 120 and the sub-substrate 140 are bonded together.

FIGS. 28A and 28B are, respectively, a top plan view and a perspective view of the optical module 102, showing the condition in which the Si platform 120 and the sub-substrate 140 are bonded together. As shown in FIGS. 28A and 28B, the outer dimensions of the hermetic sealing metallic pattern 125 formed on the Si platform 120 are larger than the outer dimensions of the sub-substrate 140. Accordingly, when the sub-substrate 140 is bonded to the Si platform 120, the hermetic sealing metallic pattern 125 is exposed around the outer periphery of the sub-substrate 140. Therefore, in the fabrication of the optical module 102, after the surface activated bonding is done, solder 170 (solder paste) is applied onto the hermetic sealing metallic pattern 125 exposed along each side of the outer periphery of the sub-substrate 140, as shown in FIG. 28B. The solder 170 need not be applied continuously around the entire periphery of the sub-substrate 140, and its amount can be appropriately adjusted.

Figure 29B:
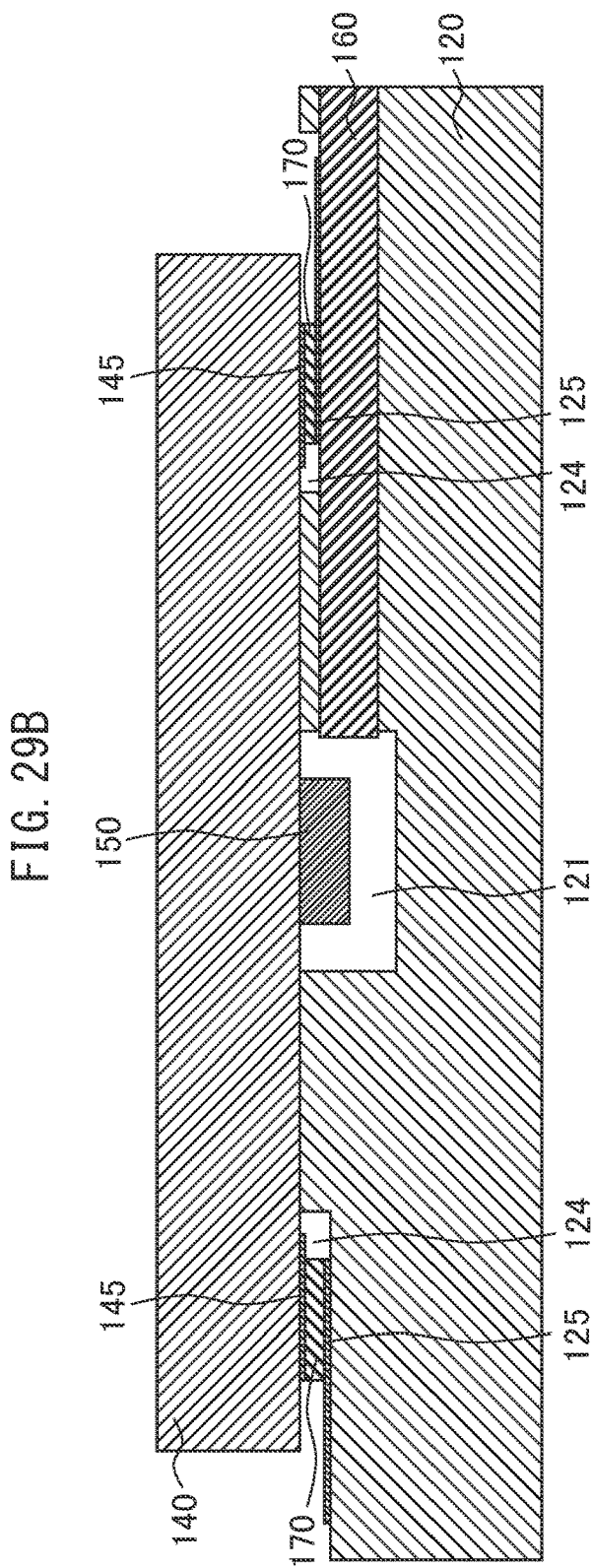
FIG. 29B is a cross-sectional view for explaining how the LD device 150 is hermetically sealed in the optical module 102.

FIGS. 29A and 29B are cross-sectional views for explaining how the LD device 150 is hermetically sealed in the optical module 102. FIG. 29A shows the condition in which the solder 170 has been applied after the surface activated bonding is done, and corresponds to a cross-sectional view taken along line XXIXA-XXIXA in FIG. 28B. On the other hand, FIG. 29B shows the condition in which the LD device 150 has been hermetically sealed by melting the solder 170, and corresponds to a cross-sectional view taken along line XXIXB-XXIXB in FIG. 27A.

When the surface activated bonding is done, some gap is left between the hermetic sealing bonding portions, i.e., the hermetic sealing metallic patterns 125 and 145, in the optical module 102, as shown in FIG. 29A, as in the optical module 101. In the optical module 102 also, since the hermetic sealing metallic pattern 125 of the Si platform 120 is formed on the bottom surface of the hermetic sealing groove portion 124 which is one step lower than the mounting surface, the surface activated bonding can be accomplished without being affected by the hermetic sealing bonding portions.

When the entire structure of the optical module to which the solder 170 has been applied is subjected to reflow heating, the solder 170 applied to each side of the sub-substrate 140 melts and spreads into the hermetic sealing groove portion 124, filling the gap between the hermetic sealing metallic patterns 125 and 145, as shown in FIG. 29B. In the optical module 101, since the presolder 136 is formed on the hermetic sealing metallic pattern 135, the entire periphery of the hermetic sealing bonding portion formed in the shape of a rectangular frame so as to surround the LD device 150 is hermetically sealed by just applying the solder 170 at one place on the outer periphery of the sub-substrate 130. On the other hand, in the optical module 102, such presolder is not formed on the hermetic sealing metallic pattern 145, but the solder 170 is applied to each peripheral side of the sub-substrate 140 so that by melting the solder 170, the gap left between the two substrates can be sealed along the entire periphery thereof to hermetically seal the LD device 150.

The hermetic sealing bonding portions employed in the optical modules 101 and 102 are structures effective in reducing the optical module size, because the hermetic sealing can be accomplished without specifically changing the module size. Furthermore, in the optical modules 101 and 102, the hermetic sealing bonding portions can not only be used for hermetic sealing but also be used to provide two electrical connection paths in combination with the alignment bonding portions. For example, the bonding portion 113 and metallic film 133 or the bonding portion 123 and metallic film 143 as the alignment bonding portions may be used to provide a power supply line, and the hermetic sealing metallic patterns 115 and 135 or the hermetic sealing metallic patterns 125 and 145 as the hermetic sealing bonding portions bonded together by the solder 170 may be used to provide a GND line.

Further, in the optical modules 101 and 102, the recessed portion 111, 121 for accommodating the LD device 150 is formed in the Si platform 110, 120, while the sub-substrate 130, 140 is constructed from a flat substrate, so that integrated circuits and their interconnect lines can be formed at high density on the sub-substrate 130, 140. As a result, in the optical modules 101 and 102, it is easy to build an LSI device such as the driver IC into the sub-substrate 130, 140, and it becomes possible to determine whether the LD device 150 is defective or non-defective on the sub-substrate alone. For example, by forming integrated circuits on a wafer and mounting a large number of LD devices, it becomes possible to perform aging (conduction test) on all the devices collectively and to sort out defectives and non-defectives. Then, the wafer is cut into separate pieces, and a non-defective one is used as the sub-substrate 130, 140; in this way, the optical modules can be fabricated by selecting only non-defectives, and the man-hour can be reduced drastically. Further, since the recessed portion and groove portion are formed only in the Si platform 110, 120, machining need be performed on only one substrate, which also serves to simplify the fabrication process.

Figure 30A:
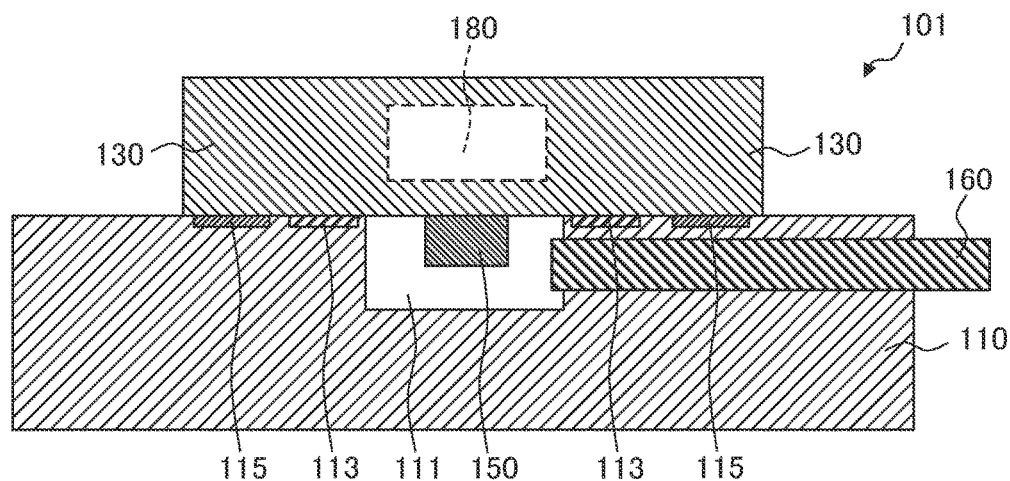
FIG. 30A is a cross-sectional view for comparing the optical modules 101 and 103.
Figure 30B:
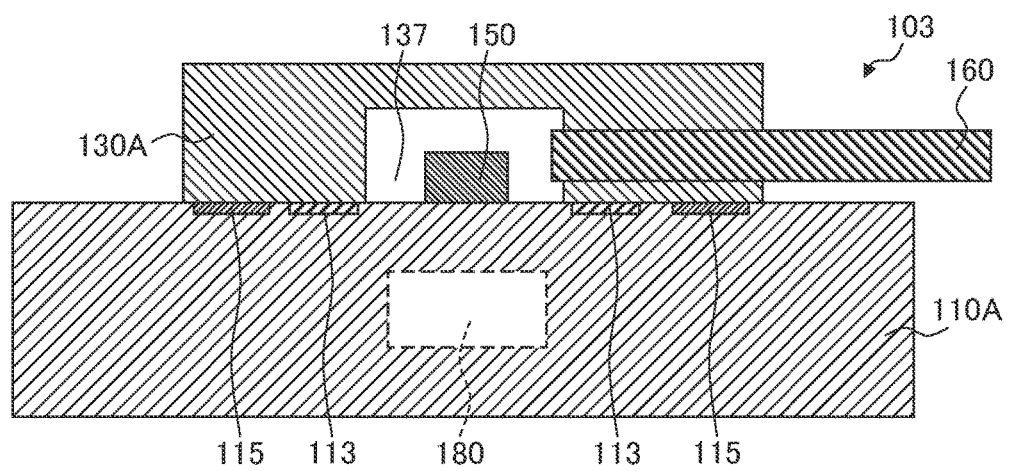
FIG. 30B is a cross-sectional view for comparing the optical modules 101 and 103.

FIGS. 30A and 30B are cross-sectional views for comparing the optical modules 101 and 103. FIG. 30A shows the optical module 101 in which the LD device 150 is mounted on the sub-substrate 130, and FIG. 30B shows the optical module 103 in which the LD device 150 is mounted on the Si platform 110A.

As shown in FIG. 30B, the LD device 150 may be mounted on the Si platform which is the lower substrate. In this case, the optical fiber 160 is fixed to the sub-substrate 130A which is mounted on the Si platform 110A. In the optical module 103, the Si platform 110A (one example of a mounting substrate and a first substrate) is a flat substrate incorporating a built-in integrated circuit (driver IC 180) for driving the LD device 150. On the other hand, the sub-substrate 130A (one example of a mounting component and a second substrate) is a substrate having a recessed portion 137 for accommodating the LD device 150. In the optical module 103 also, the LD device 150 is hermetically sealed by providing hermetic sealing bonding portions similar to those in the optical modules 101 and 102 and applying solder to an outer peripheral portion of the sub-substrate 130A which is the mounting component. When the Si platform 110A is constructed from a flat substrate that does not include a recessed portion for accommodating the LD device 150, as in the optical module 103, integrated circuits and their interconnect lines can be formed at high density on the Si platform 110A. Furthermore, when the Si platform is flat, it is easier to cause the LD device to emit light for active alignment than when the LD device is mounted on the sub-substrate.

In any of the optical modules 101 to 103, the recessed portion for the LD device 150, the groove portion for the optical fiber 160, and the hermetic sealing groove portion may be formed in both the Si platform and the sub-substrate. However, if these recessed and groove portions are formed in both of the substrates, the area to be sealed for hermetic sealing increases; therefore, it is preferable to form them in either one of the substrates.

To achieve the hermetic sealing, the solder 170 need not necessarily be applied to the outer peripheral portion of the sub-substrate that contacts the Si platform. For example, the hermetic sealing between the two substrates may be achieved by pre-applying solder to the bonding surfaces of the two substrates, opening a through-hole in the sub-substrate, and melting the solder by laser heating through the through-hole.

Further, in an optical module having a plurality of LD devices, each for emitting light of one of the R, G, and B colors, as in the optical module 2 shown in FIG. 13, alignment bonding portions and hermetic sealing bonding portions similar to those in the optical modules 101 to 103 may be provided between the Si platform and the plurality of sub-substrates covering the respective LD devices. That is, the LD devices 20R, 20G, and 20B in the optical module 2 can individually be hermetically sealed between the Si platform 10' and the sub-substrates 50R, 50G, and 50B, respectively, by using hermetic sealing bonding portions similar to those in the optical modules 101 to 103.

Further, like the PD devices 25R, 25G, and 25B in the optical module 2, devices other than the LD devices may also be mounted fixedly on a single Si platform and may be hermetically sealed with the respective corresponding sub-substrates. Further, the driver IC may not be built into the substrate, but may be mounted on the sub-substrate or on the Si platform, as in the optical module 2.

Likewise, in an optical module in which laser light from an LD array is optically coupled into an optical fiber array constructed from a plurality of optical fibers, as in the optical module 3 shown in FIG. 14, alignment bonding portions and hermetic sealing bonding portions similar to those in the optical modules 101 to 103 may be provided between the Si platform and the sub-substrate having a plurality of groove portions equal in number to the optical fibers contained in the optical fiber array. That is, the LD array 20A in the optical module 3 can jointly be hermetically sealed between the Si platform 10A and the sub-substrate 50A by using hermetic sealing bonding portions similar to those in the optical modules 101 to 103.

Figure 31A:
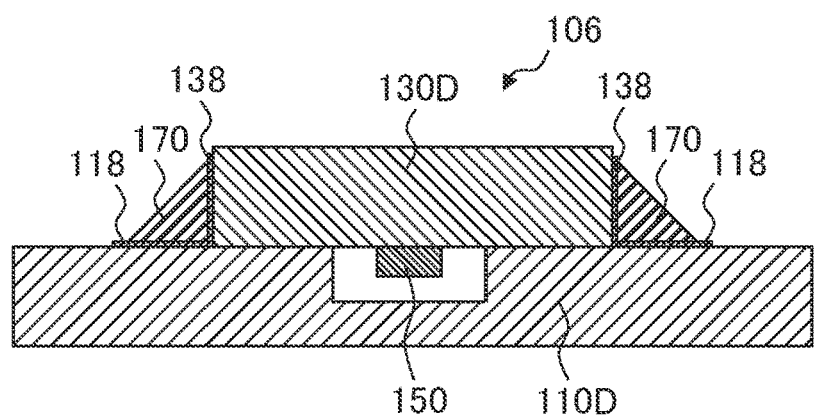
FIG. 31A is a cross-sectional view schematically illustrating the structure of an optical module 106.
Figure 31B:
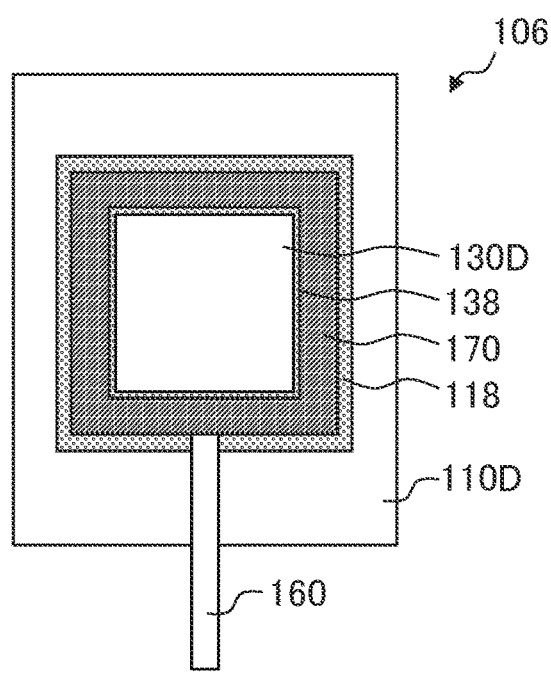
FIG. 31B is a top plan view schematically illustrating the structure of an optical module 106.

FIGS. 31A and 31B are, respectively, a cross-sectional view and a top plan view schematically illustrating the structure of an optical module 106. The optical module 106 includes a Si platform 110D and a sub-substrate 130D similar to the respective substrates of the optical module 101. A hermetic sealing metallic pattern 118 is formed on the upper surface of the Si platform 110D, and a hermetic sealing metallic pattern 138 is formed on the side face of the sub-substrate 130D. The hermetic sealing metallic patterns 118 and 138 are each formed, for example, by applying gold plating after applying copper or nickel plating as primary plating. The hermetic sealing metallic patterns 118 and 138 correspond to the hermetic sealing bonding portions in the optical module 106, and are joined together by solder 170. Except for the hermetic sealing bonding portions, the structure of the optical module 106 is the same as the structure of the optical module 101.

The optical module 106 differs from the optical module 101 in that a groove portion corresponding to the hermetic sealing groove portion 114 in the optical module 101 is not provided, and in that the hermetic sealing metallic patterns 118 and 138 formed on the Si platform 110D and the sub-substrate 130D, respectively, are each formed in a position that is not covered with the opposite substrate. As in the optical module 106, the LD device 150 may be hermetically sealed by first forming the hermetic sealing metallic pattern 118 on the upper surface of the Si platform 110D so as to surround the portion where the sub-substrate 130D is to be mounted and also forming the hermetic sealing metallic pattern 138 on the side face of the sub-substrate 130D, and then joining together the hermetic sealing metallic patterns of the two substrates by the solder 170. Here, at least a portion of each hermetic sealing metallic pattern need be formed in a position that is not covered with the opposite substrate, and other portions of the hermetic sealing metallic patterns 118 and 138 may be covered with the opposite substrate. In such cases, since there is no need to form the hermetic sealing metallic pattern on the bonding surface of the sub-substrate, the size of the sub-substrate can be reduced.

Figure 32:
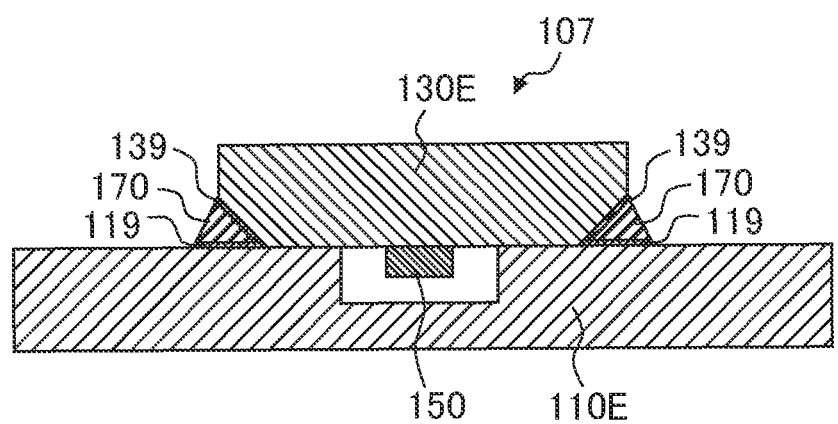
FIG. 32 is a perspective view schematically illustrating the structure of an optical module 107.

FIG. 32 is a perspective view schematically illustrating the structure of an optical module 107. The optical module 107 includes a Si platform 110E similar to the Si platform 110 of the optical module 101, and a sub-substrate 130E around the periphery of which a slant cut face is formed by wet etching or the like. A hermetic sealing metallic pattern 119 is formed on the upper surface of the Si platform 110E, and a hermetic sealing metallic pattern 139 is formed on the slant cut face of the sub-substrate 130E. The hermetic sealing metallic patterns 119 and 139 correspond to the hermetic sealing bonding portions in the optical module 107, and are joined together by solder 170. Except for the hermetic sealing bonding portions, the structure of the optical module 107 is the same as the structure of the optical module 101.

In the optical module 107, as in the optical module 106, a groove portion corresponding to the hermetic sealing groove portion 114 in the optical module 101 is not provided, and the hermetic sealing metallic patterns 119 and 139 formed on the Si platform 110E and the sub-substrate 130E, respectively, are each formed in a position that is not covered with the opposite substrate. However, in the optical module 107, since the hermetic sealing metallic pattern 139 is formed on the slant cut face formed around the outer periphery of the sub-substrate 130E, the portion of the solder 170 that protrudes on the upper surface of the Si platform 110E is smaller than that in the optical module 106.

REFERENCE SIGNS LIST 1, 2, 3, 4, 5, 101, 102, 103, 106, 107 optical module
10, 10', 10A, 10D, 10E, 110, 110A, 110D, 110E, 120 Si platform
15, 15', 16, 16', 113, 123 bonding portion
17, 112, 122, 51, 51' groove portion
20, 20', 20R, 20G, 20B, 20A, 150 LD device
22 active layer
30, 30', 180 driver IC
40, 40R, 40G, 40B, 160 optical fiber
50, 50', 50R, 50G, 50B, 50A, 50D, 50E, 130, 130A, 130D, 130E, 140 sub-substrate
52, 52', 111, 121, 137 recessed portion
53, 53', 133, 143 metallic film
114, 124 hermetic sealing groove portion
115, 118, 119, 125, 135, 138, 139, 145 hermetic sealing metallic pattern
136 presolder
161, 161' fiber metal
170 solder

What is claimed is:

1. A mounting component formed from silicon for optically coupling a laser device to an optical fiber by being bonded to a mounting substrate on which the laser device is mounted, comprising:
a silicon-on-insulator layer contained in the mounting component;
a groove portion for fixedly holding the optical fiber so that a core of the optical fiber is positioned at a predetermined depth with respect to a bonding surface to be bonded to the mounting substrate; and
a recessed portion, formed continuous with the groove portion, for accommodating the laser device, wherein
a thickness of the mounting component, measured in a direction perpendicular to the bonding surface, is chosen so that a position of the laser device can be detected using an infrared transmission image when the laser device is accommodated in the recessed portion by placing the bonding surface in contact with the mounting substrate,
the groove portion is formed on the bonding surface and has a bottom surface as deep as the silicon-on-insulator layer, and
the recessed portion is formed on the bonding surface and has a bottom surface deeper than the silicon-on-insulator layer.

2. The mounting component according to claim 1, wherein the thickness in the direction perpendicular to the bonding surface is not less than 200 μm and not greater than 1000 μm.

3. The mounting component according to claim 1, wherein the bonding surface has a metallic film for surface activated bonding to metallic micro-bumps provided on the mounting substrate.

* * * * *